US005781419A

United States Patent [19]
Kutkut et al.

[11] Patent Number: 5,781,419
[45] Date of Patent: Jul. 14, 1998

[54] SOFT SWITCHING DC-TO-DC CONVERTER WITH COUPLED INDUCTORS

[75] Inventors: Nassar H. Kutkut; Deepakraj M. Divan, both of Madison, Wis.

[73] Assignee: Soft Switching Technologies, Inc., Middleton, Wis.

[21] Appl. No.: 631,324

[22] Filed: Apr. 12, 1996

[51] Int. Cl.⁶ .................... H02M 3/335; H02M 7/5387
[52] U.S. Cl. ...................... 363/17; 363/39; 363/132
[58] Field of Search .................. 363/17, 34, 39, 363/37, 49, 98, 132, 65, 71

[56] References Cited

U.S. PATENT DOCUMENTS

| | | |
|---|---|---|
| 3,443,195 | 5/1969 | Hoffman, Jr. et al. |
| 4,055,791 | 10/1977 | Bland et al. |
| 4,184,197 | 1/1980 | Cuk et al. |
| 4,253,136 | 2/1981 | Nanko . |
| 4,336,583 | 6/1982 | Campbell et al. |
| 4,386,394 | 5/1983 | Kocher et al. |
| 4,415,959 | 11/1983 | Vinciarelli . |
| 4,441,146 | 4/1984 | Vinciarelli . |
| 4,481,565 | 11/1984 | Colton . |
| 4,486,823 | 12/1984 | Palm . |
| 4,499,531 | 2/1985 | Bray . |
| 4,675,797 | 6/1987 | Vinciarelli . |
| 4,688,160 | 8/1987 | Fraidlin . |
| 4,899,271 | 2/1990 | Seiersen . |
| 5,027,264 | 6/1991 | DeDoncker et al. |
| 5,181,170 | 1/1993 | Huang et al. |
| 5,224,025 | 6/1993 | Divan et al. |
| 5,434,770 | 7/1995 | Dreifuerst et al. ............ 363/65 |
| 5,539,630 | 7/1996 | Pietkiewicz et al. ........... 363/17 |
| 5,546,295 | 8/1996 | Prete et al. .................... 363/17 |
| 5,552,976 | 9/1996 | Munro et al. .................. 363/39 |

OTHER PUBLICATIONS

Kevan O'Meara, "A New Output Rectifier Configuration Optimized for High Frequency Operation," HFPC, Jun. 1991 Proceedings, pp. 219–225.

C. Peng, et al., "A New Efficient High Frequency Rectifier Circuit," HFPC, Jun. 1991 Proceedings, pp. 236–243.

William A. Peterson, et al., "A Clamped Transformer Power Supply Producing Zero Voltage Resonant Transitions Over the Full Load Range," IEEE, pp. 286–292, 1994.0.

Nasser H. Kutkut, et al., "An Improved Full–Bridge Zero–Voltage Switching PWM Converter Using a Two–Inductor Rectifier," IEEE Trans. on Ind. App., vol. 31, No. 1, pp. 119–126, Jan./Feb. 1995.

Y. Nagai, et al., "A 48V 100A Switching Power Supply Unit and Its Application," INTELEC '88 Conference Proceedings, 1988, pp. 421–428.

(List continued on next page.)

*Primary Examiner*—Peter S. Wong
*Assistant Examiner*—Rajnikant B. Patel
*Attorney, Agent, or Firm*—Foley & Lardner

[57] ABSTRACT

A DC-to-DC converter topology is provided having switching devices that are switched under zero voltage switching conditions to minimize switching losses. The converter of the present invention includes two input side converter bridges, each based on a two switch forward converter topology. The input side converter bridges may be connected in series for high input voltage levels and in parallel for low voltage levels. The switching devices of each input side converter bridge are coupled together by coupling inductors. The turning-off of a switching device in one bridge causes part of the energy stored in the corresponding coupled inductor to discharge an output capacitance of an incoming switching device in the other bridge, causing an anti-parallel connected diode to conduct. The incoming switch can thus be turned on under zero voltage switching conditions. Zero voltage switching can be achieved over a wide load range by properly sizing the coupled inductors. The converter switching devices are preferably provided switching signals from a peak current control controller that controls the duty cycle of the converter to regulate the peak of the output currents to control the output power delivered to a load.

27 Claims, 10 Drawing Sheets

OTHER PUBLICATIONS

"Design Review: A 300W, 300KHz Current–Mode Half–Bridge Power Supply With Multiple Outputs Using Coupled Inductors," in *Unitrode Switching Regulated Power Supply Design Seminar Manual* by Unitrode Corporation, 1990, pp. A1–1 to A1–6.

Oliver D. Patterson, et al., "Pseudo–Resonant Full Bridge DC/DC Converter," IEEE Trans. on Power Elec., vol. 6, No. 4, Oct. 1991, pp. 671–678.

Nils Backman, et al., "A New Light–Weight 100A/48V Three–Phase Rectifier," INTELEC '91 Confernece Proceedings, Nov. 1991, pp. 92–97.

M1: Q1 & Q4 ON, Ds2 ON

M2: Q4 turned off → D6 is ON → Q6 turned on under ZVS
Q1 & D3 ON, Ds1 & Ds2 ON $V_f = V_{Q1} + V_{D3}$ M3: Q1 turned off → D5 is ON → Q7 turned on under ZVS
D2 & D3 ON, D6 & D7 ON, Ds1 & Ds2 ON M4: Q6 & Q7 ON, Ds1 & Ds2 ON M5: Q6 & Q7 ON, Ds1 ON

SOFT SWITCHING DC-TO-DC CONVERTER WITH COUPLED INDUCTORS

FIELD OF THE INVENTION

This invention pertains generally to the field of AC-to-DC and DC-to-DC electrical power conversion, and more particularly to DC-to-DC power converters having converter switches that are switched under zero voltage or current switching conditions.

BACKGROUND OF THE INVENTION

Most of the DC-to-DC converters in use today are derived from three basic converter topologies: buck, boost, and buck-boost converters. For high power levels, a full-bridge DC-to-DC converter, derived from the buck converter topology, is preferred. This type of converter typically includes a DC-to-AC converter circuit and an AC-to-DC converter circuit linked together by a high frequency AC link. Isolation is provided on the intermediate AC link. The main advantages of this converter topology include: constant frequency operation, which allows optimum design of magnetic filter components, pulse width modulation (PWM) control, minimum voltage and current (VA) stresses, and good control range and controllability.

The conventional DC-to-DC converter topology employs converter switches implemented using semiconductor switching devices. High frequency operation of these switching devices is a desirable feature, since the size of the magnetic and passive components of the converter may be reduced for high frequency operation. Unfortunately, as the switching frequency is increased, the switching losses in the semiconductor switching devices are increased as well. Switching losses result from turning the converter switches on and off in the presence of high voltage or current levels. This type of converter is known as a "hard-switching" converter. The increase in device switching losses as the switching frequency increases, and high voltage stresses induced by parasitic inductances following reverse recovery of diodes in the converter circuit, are major drawbacks of conventional hard-switching converter topologies.

Different schemes have been developed to reduce the additional switching losses caused by high frequency switching of conventional hard-switching converters. For example, semiconductor switching losses can be reduced by using reactive snubber elements. Exemplary reactive snubber elements are illustrated in FIGS. 1 and 2. As illustrated in FIG. 1, a snubber capacitor 30 may be connected in parallel with a converter semiconductor switch 32, having an anti-parallel connected diode 34. Alternatively, as illustrated in FIG. 2, a snubber inductor 36 may be connected in series with a converter semiconductor switch 38. These snubber elements 30 and 36 tend to limit the rate of rise of voltage (FIG. 1) or current (FIG. 2) experienced by the switching device 32 or 38. Thus, snubber elements 30 and 36 provide an easy method to divert the energy that would be dissipated in the switching device 32 or 38 during switching. However, the energy stored in the snubber elements 30 and 36 needs to be dissipated during a subsequent part of the switching cycle.

Converters that allow lossless resetting of the reactive snubber energy are referred to as "soft-switching" converters. Soft-switching converters may be broadly categorized as zero voltage switching or zero current switching converters. The snubber circuit illustrated in FIG. 1 would be implemented in zero voltage switching converters, and the snubber circuit illustrated in FIG. 2 would be implemented in zero current switching converters. Various zero voltage switching and zero current switching soft-switching schemes and converter topologies have been proposed in an attempt to achieve increased performance over conventional hard-switching converters.

An exemplary soft-switching converter circuit topology is the full-bridge PWM converter shown at 40 in FIG. 3. This converter topology 40 achieves PWM control with resonant switching of the converter semiconductor switches. The basic DC-to-DC converter circuit topology 40 includes an input side circuit 42 and an output side circuit 44 with the input circuit 42 and output circuit 44 linked by a transformer 46. The transformer 46 includes a primary winding 48, a secondary winding 50, and is characterized by a leakage inductance 52. The primary 48 of the transformer 46 is connected to a DC input voltage source 54 by a bridge of converter switches that forms the input circuit 42. Four semi-conductor switching devices 56–59, e.g., transistors, form the input side circuit 42 converter bridge. Each switching device 56–59 includes an anti-parallel connected diode 60–63 and parallel connected capacitor 64–67. The output side circuit 44 connects the secondary winding 50 of the transformer 46 to a load, shown here as a resistance load 68, by a diode bridge including four diodes 70–73. An output side filter inductor 74 is connected in series between the diode bridge and the load 68. An output side capacitor 76 is connected in parallel with the load 68. In operation, a PWM controller is used to switch the input side circuit switching devices 56–59 in a sequence to generate an AC signal from the DC voltage source 54 across the primary winding 48 of the transformer 46. The resulting AC signal appearing on the secondary winding 50 of the transformer 46 is rectified by the diodes 70–73 of the output side circuit 44 to provide a DC output voltage to the load 68. The output side inductor 74 and capacitor 76 filter high frequency and transient voltages from the output voltage applied to the load 68. The magnitude of the DC output voltage applied to the load 68 is determined by the magnitude of the DC source voltage, the duty cycle of the PWM controller, and the turns ratio of the transformer 46.

In the DC-to-DC converter topology 40, the leakage 52 and magnetizing inductances of the transformer 46 are effectively utilized to achieve zero voltage switching of the switching devices 56–59. The operation of the full-bridge PWM converter 40, to achieve zero voltage switching, is as follows. With input circuit switching devices 56 and 59 initially turned on and conducting, the voltage applied across the primary winding 48 of the transformer 46 will be the voltage level of the voltage source 54, $V_{in}$. A corresponding voltage will appear on the secondary winding 50 of the transformer 46, causing an output current to flow through diodes 70 and 73. When switching device 59 in the input side circuit 42 is turned off, the input voltage 54 is disconnected from the primary winding 48. With the input voltage $V_{in}$ no longer applied to the primary winding 48 of the transformer 46, the current in the output side circuit 44 will free wheel through all of the output side diodes 70–73. A current thus continues to flow through the output side filter inductor 74 to provide power to the load 68. This stored energy in the output side circuit 44 is reflected back through the transformer 46 to the input side circuit 42. The continued flow of current through the primary winding 48 charges the output capacitance 67 of the input side switching device 59, and discharges the output capacitance 66 of input side switching device 58. This causes the anti-parallel connected diode 62 of switching device 58 to conduct. Thus, at this point, switching device 58 can be turned on under zero voltage switching conditions. Since the energy available for achieving zero voltage switching for the leading leg switching devices 58 and 59 is the energy stored in the output filter inductor 74, zero voltage switching can be achieved even at light loads.

After input side switching device 58 is turned on, input side switching device 56 may be turned off, at a later point in time. Current still flows through the primary winding 48 of the transformer 46 due to energy stored in the leakage inductance 52 of the transformer 46. When switching device 56 is turned off, this current charges the output capacitance 64 of switching device 56 and discharges the output capacitance 65 of switching device 57, causing the anti-parallel connected diode 61 of switching device 57 to conduct. Thus, switching device 57 may now be turned on under zero voltage switching conditions, to once again apply the input voltage $-V_{in}$ to the primary winding 48 of the transformer 46. The switching sequence is then repeated for the turn-off of input side switching devices 58 and 57, and the turn-on of input side switching devices 56 and 59. In order to ensure zero voltage turn-on of the switching devices 56 and 57 in the lagging leg of the input side circuit bridge 42, enough energy needs to be stored in the leakage inductance 52 of the transformer 46 to provide for charging and discharging of the switching device capacitors 64-67 throughout the switching sequence. Since the energy in the leakage inductance 52 is a function of the current to the load 68, zero voltage switching will be lost below a certain load level for the lagging leg switching devices 56 and 57. One way to extend the load range of the DC-to-DC converter 40 is thus by properly sizing the leakage inductance 52 of the transformer 46.

In order to further extend the zero voltage switching range of the full bridge DC-to-DC converter topology, a pseudo-full bridge PWM DC-to-DC converter circuit topology 80, as illustrated in FIG. 4, may be used. The pseudo-full bridge converter circuit 80 shares a similar circuit topology to the converter circuit 40 illustrated in FIG. 3. Corresponding circuit elements of circuits 40 and 80 are thus labeled with the same reference numerals. The pseudo-full bridge DC-to-DC converter circuit 80, however, includes a commutation inductor 82 connected to the input side circuit pole 84 where the lagging leg switching devices 56 and 57 are connected together. The other end of the commutation inductor 82 is connected to a center point node 86 where two series connected capacitors 88 and 90, of equal capacitance, are connected together. The series connected capacitor pair is connected in parallel across the input voltage source 54. The switching sequence for the input side circuit switches 56-59 of the pseudo-full bridge converter circuit 80 is the same as for the switching devices in the converter circuit 40 of FIG. 3, described above. However, in this case, additional energy is stored in the commutation inductor 82 when the input side switching devices 56 and 57 are on and conducting. This energy provides for the charging and discharging of the switching device capacitors 64-67, allowing zero voltage turn-on for the lagging leg switches 56 and 57, even at light loads. The penalty for adding a commutation inductor 82 is the additional cost involved for the inductor 82 itself, in addition to the winding losses incurred within the inductor winding 82. However, at high power levels, especially high output current levels, the incremental cost of the commutation inductor 82 is negligible, while the additional winding losses are compensated for by the savings in switching losses.

Another disadvantage of the full bridge PWM DC-to-DC converter topology 40, as well as the pseudo-full bridge PWM DC-to-DC converter topology 80, is susceptibility to shoot through. It is apparent, in either circuit, that if two switching devices in the same leg of the input side circuit 42, e.g., switching devices 56 and 57, are accidentally turned on at the same time, a short circuit will be created across the input voltage source 54. If a shoot through condition occurs, the switching devices 56 and 57 will fail. Thus, additional protection and control circuitry needs to be added to the circuit topology 40 or 80 to detect shoot through conditions, and to disable switching signals to the switching devices 56-59 if the current in the devices exceeds a preset level. Such control circuitry needs to be fast and accurate to prevent any possible faulty operation.

The DC input voltage $V_{in}$ for DC-to-DC converters is typically obtained by the use of simple AC-to-DC converter circuits connected to AC power sources. At high power levels, three phase power is the most common form of power source available. Thus, a high power DC input voltage source may be obtained by the use of a simple three phase AC-to-DC rectifier bridge circuit 100, as illustrated in FIG. 5. In this converter circuit 100, three phase power, such as from utility power lines, is applied on input lines 102-104 to a rectifier bridge formed of diodes 106-111. The bridge of diodes 106-111 rectifies the three phase input power from the power lines 102-104 to form the DC voltage $V_{in}$ across output filter capacitors 112 and 113. The capacitors 112 and 113, in combination with filter inductor 115, connected in series between the rectifier bridge diodes 106-111 and the capacitors 112 and 113, act to filter high frequency components and transients from the voltage $V_{in}$. The output voltage of the AC-to-DC converter 100 is applied to DC bus lines 114, which may, in turn, be connected to the DC bus lines of a DC-to-DC converter circuit.

Due to the different AC input voltage levels available at different sites, e.g., 230 V or 460 V, etc., the voltage $V_{in}$ on the DC bus 114 will be different as the AC-to-DC converter circuit 100 is connected to power supplies at the different sites. As an example, with a 230 V AC three phase input voltage, the maximum DC bus voltage is 325 V DC. With a 460 V AC input voltage, the DC bus voltage is 650 V DC. As a result, a DC-to-DC converter that is provided DC power from an AC-to-DC converter 100, has to be designed specifically to match the input voltage source available at the particular site. This is due to the fact that the power switching devices, e.g., 56-59, in the DC-to-DC converter have to be sized so as to operate safely at the prescribed DC bus voltage levels. For the exemplary DC-to-DC converter circuits 40 and 80 described above, with insulated gate bipolar transistor (IGBT) switching devices 56-59, which are the most suitable devices at high power levels, 600 V devices are needed for the 230 V AC input voltage case, while 1200 V parts are needed for the 460 V AC case.

SUMMARY OF THE INVENTION

In accordance with the present invention, a new soft-switching DC-to-DC converter topology is provided. The new topology includes two input side converter bridges that are coupled together through coupled inductors. Energy stored in the coupled inductors ensures zero voltage switching conditions for the input side converter bridge switching devices, making high frequency, switching loss free, operation of the DC-to-DC converter possible at all load levels. Each input side converter bridge is based on a two switch forward converter topology. Each switching device in each bridge is connected in series with a reverse conducting diode. Thus, no shoot through is possible, and the topology is shoot through proof. In addition, the use of two switching bridges provides the capability of connecting the two bridges in parallel for low line voltages and in series for high line voltages. Hence, the same DC-to-DC circuit topology, with the same devices, can be used for different input line voltages. Parallel or series connection of the input side converter bridges is selected to maintain the device voltage stresses the same for both the low line voltage and high line voltage cases.

Two input side converter bridges connect DC bus lines, to which a DC input voltage source may be applied, to primary windings of a transformer. The secondary winding of the transformer is connected to an output side converter circuit. The switching devices in the input side converter bridge circuits are controlled to connect the DC input voltage to the primary windings of the transformer alternately, and in opposite polarities, through the first and second bridge. Thus, an AC signal is applied to the primary windings of the transformer and, in turn, an AC signal appears on the secondary winding of the transformer. The AC voltage on the secondary winding of the transformer is rectified by the output side converter circuit into a DC output voltage that may be applied to a load. The switching devices in the input side converter bridge circuits are controlled to switch at high frequency under zero voltage switching conditions, to eliminate switching losses.

Zero voltage switching of the input side converter bridge switching devices is achieved at all load currents by energy stored in a pair of coupled inductors that couple the two input side converter bridges together. Each coupled inductor is connected so that it couples the pole of one input side converter bridge to the complementary pole of the other converter bridge. When a switching device in one of the input side converter bridges is on and conducting, energy is stored in the coupled inductor windings. This energy stored in the coupled inductor is then used to charge the output capacitance of a turned-off switching device in one of the input side converter bridges, while discharging the output capacitance of an incoming switching device in the other input side converter bridge, causing its anti-parallel connected diode to conduct. The incoming switching device can then be turned on under zero voltage switching conditions. The coupled inductors commutate both poles of the converter bridges in this manner once a switching device in either converter bridge is turned off. This mechanism allows zero voltage turn-on for all of the input side switching devices, and hence, allows high frequency switching with no turn-on losses.

The coupled inductors are preferably connected in each input side converter bridge circuit between the poles of the converter bridge and the center point node of a split capacitor arrangement, of two series connected capacitors of equal capacitance, connected in parallel with the DC input voltage source, i.e., across the DC bus lines. An auxiliary winding on the main transformer is preferably used to maintain equal voltage levels on each capacitor of the split capacitor arrangement. The auxiliary winding is connected between the center point node of the split capacitors and the connection node of two series connected diodes that are, in turn, connected in parallel with the series connected split capacitors and the DC input voltage source. The auxiliary transformer winding, along with the diodes, act to equalize the voltage on the two capacitors on a continuous basis. Maintaining the split capacitors with the same voltage level is a necessity, particularly for peak current mode control of the soft switching DC-to-DC converter of the present invention, where small differences in the two capacitor voltages will otherwise tend to get worse.

The DC output voltage level provided by a soft switching DC-to-DC converter in accordance with the present invention is a function of the input source voltage applied to the converter, the turns ratio of the converter transformer, and the duty cycle of the switching devices in the input side converter bridges. Various controllers may be employed to provide switching signals to turn on and turn off the converter switching devices under zero voltage switching conditions to provide the desired DC output voltage level. A preferred controller for the soft switching DC-to-DC converter of the present invention is a peak current controller. In this type of controller, a peak value of the output current is regulated to control the output power delivered to the load. Peak current control provides immunity against imbalances in switching between the two input side converter bridges, since no net DC flux is allowed to accumulate in the main transformer core. The preferred controller for the soft switching DC-to-DC converter of the present invention will thus maintain the peak of the output current constant, and hence null any flux imbalance in the main transformer. Another advantage of peak current control is the inherent feed forward of input DC bus voltage disturbances due to low frequency ripple. If the DC bus voltage increases, the output current will ramp up faster and will hit the preset peak earlier, reducing the duty cycle of the converter. The converse is also true. The controller for the soft switching DC-to-DC converter of the present invention also preferably employs slope compensation as part of its peak current control scheme. For slope compensation, a percentage of the down slope of the output side circuit current is added to the slope of the sensed current. This will tend to reduce errors accumulated due to disturbances at high duty cycles, and hence eliminates harmonic oscillations and resulting instability.

A soft switching DC-to-DC converter circuit in accordance with the present invention was simulated. Also, an experimental soft switching DC-to-DC converter circuit was made and tested. Simulation and experimental results for these circuits are provided.

Further objects, features, and advantages of the invention will be apparent from the following detailed description when taken in conjunction with the accompanying drawings.

DETAILED DESCRIPTION OF THE INVENTION

Figure 6:
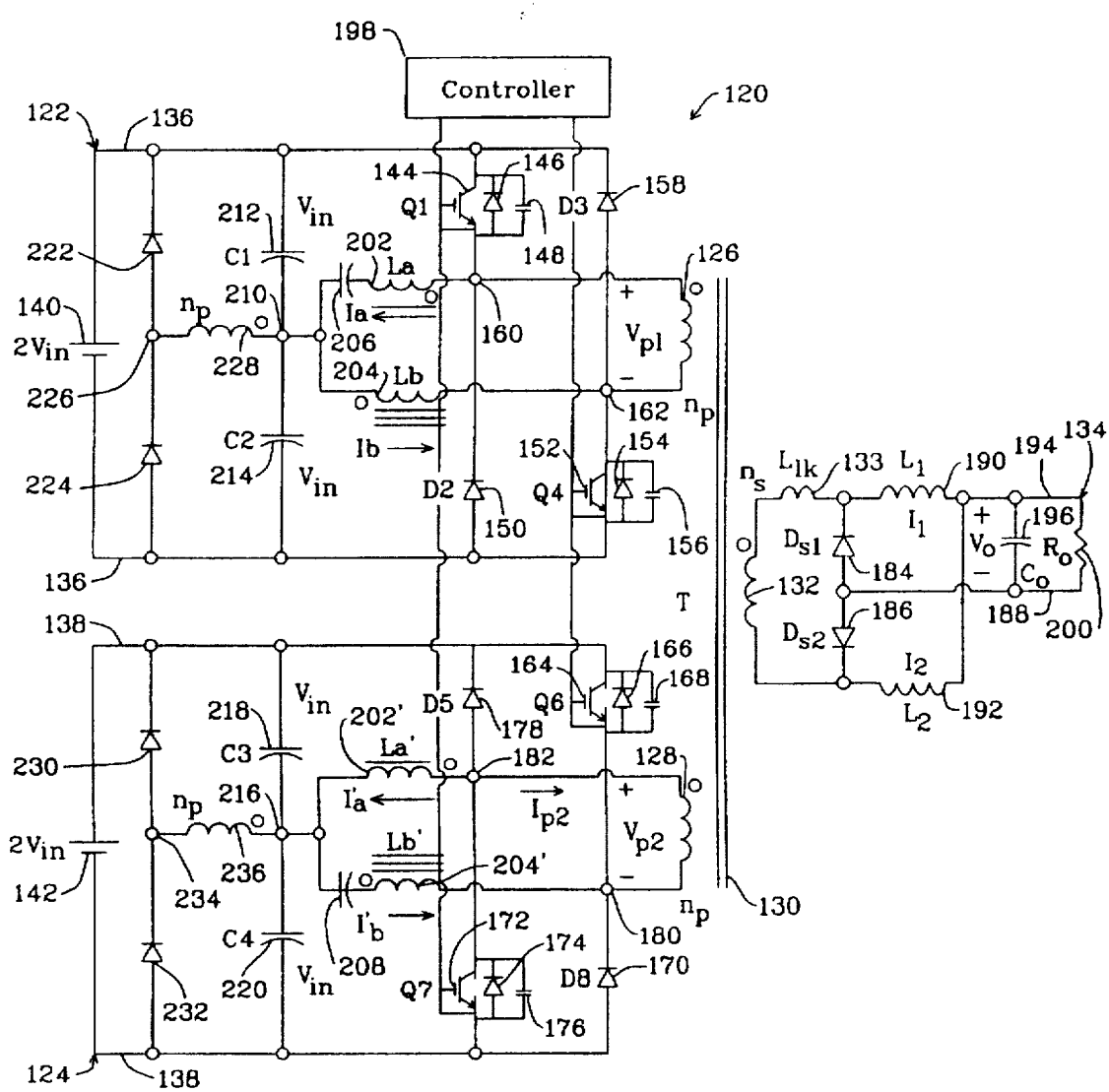
FIG. 6 is a schematic circuit diagram of a soft switching DC-to-DC converter circuit in accordance with the present invention.

A soft switching DC-to-DC converter with coupled inductors in accordance with the present invention is described with reference to the schematic circuit diagram of FIG. 6. The DC-to-DC converter circuit 120 includes two input side converter bridge circuits 122 and 124 connected to primaries 126 and 128 of a transformer 130. The secondary winding 132 of the transformer 130 is connected to an output side converter circuit 134. The transformer 130 is also characterized by a leakage inductance 133. Each input side converter bridge circuit 122 and 124 includes DC bus lines 136 and 138, respectively, that are adapted to be connected to an input DC voltage source 140 or 142. Each input side converter bridge circuit 122 and 124 is based on a two switch forward converter topology. The switching devices in each input side converter bridge circuit may preferably be implemented as gate controlled semiconductor transistors such as an IGBTs or power MOSFETs. The first converter bridge 122 includes a first switching device 144, hereinafter referred to as switching device Q1, including an anti-parallel connected diode 146 and parallel connected capacitor 148, connected in series with a reverse conducting diode 150, hereinafter referred to as diode D2, between the DC bus lines 136 of the first input side converter bridge circuit 122. Note that the reverse conducting diodes of the DC-to-DC converter circuit should be considered to include any substantially one directional current carrying device, including a switching device. A second switching device 152, hereinafter referred to as switching device Q4, having an anti-parallel connected diode 154 and a parallel connected capacitor 156, is similarly connected in series with a second reverse conducting diode 158, hereinafter referred to as diode D3, between the DC bus lines 136 of the first input side converter bridge circuit 122. The first switching device Q1 and first diode D2 are connected together at a first pole 160 of the first input side converter bridge circuit 122, and the second switching device Q4 and second diode D3 are connected together at a second pole 162 of the first input side converter bridge circuit 122. A primary winding 126 of the transformer 130 is connected between the poles 160 and 162. Thus, when switching devices Q1 and Q4 are on and conducting, a current will flow through the primary winding 126 from the first pole 160 to the second pole 162.

The second input side converter bridge circuit 124 similarly includes a first switching device 164, hereinafter referred to as switching device Q6, with an anti-parallel connected diode 166 and a parallel connected capacitor 168, connected in series with a first reverse conducting diode 170, hereinafter referred to as diode D8, between the DC bus lines 138 of the second input side converter bridge 124. A second switching device 172, hereinafter referred to as switching device Q7, with an anti-parallel connected diode 174 and a parallel connected capacitor 176, is connected in series with a second reverse conducting diode 178, hereinafter referred to as diode D5, between the DC bus lines 138 of the second input side converter bridge circuit 124. The first switching device Q6 of the second input side converter bridge 124 is connected to the first diode D8 at a first pole 180 of the second input side converter bridge circuit 124. The second switching device Q7 is connected to the second diode D5 at a second pole 182 of the second input side converter circuit 124. A second primary winding 128 of the transformer 130 is connected between the first and second poles 180 and 182 so that, when switching devices Q6 and Q7 are on and conducting, a current flows through the primary winding 128 from the first pole 180 to the second pole 182. Note that the primary windings 126 and 128 are connected in opposite polarities to the input side converter bridge circuits 122 and 124, respectively, such that, when the switching devices of each bridge are conducting, the current flow through each of the primaries 126 and 128 will be in opposite directions. Note also that, since each switch Q1, Q4, Q6, and Q7 is connected in series with a reverse conducting diode D2, D3, D8, and D5, respectively, there is no possibility of a short circuit through the switching devices across the input voltage sources 140 and 142. Thus, the circuit topology of the present invention is shoot through proof.

The output side converter circuit 134 of the DC-to-DC converter 120 preferably includes two series connected diodes 184 and 186, hereinafter referred to as diodes $D_{S1}$ and $D_{S2}$, respectively, connected in parallel with the secondary winding 132 of the transformer 130. The output side diodes $D_{S1}$ and $D_{S2}$ are illustrated as being connected anode-to-anode; however, a cathode-to-cathode connection of the input side diodes $D_{S1}$ and $D_{S2}$ could also be used. A first terminal 188 of the output side circuit 134 is connected to the connection point of the output side diodes $D_{S1}$ and $D_{S2}$. Output side filter inductors 190 and 192 are connected at one end to each terminal of the secondary winding 132 of the transformer 130. The other ends of the output side filter inductors 190 and 192 are connected to the second terminal 194 of the output side circuit 134. A load 200, illustrated here as a resistor, may be connected across the output terminals 188 and 194. A filter capacitor 196 is preferably connected between the terminals 188 and 194 to filter high frequency and transient components from a signal applied to the load 200. Note that the output side circuit 134 operates to rectify an AC signal on the secondary winding 132 of the transformer 130 to provide DC power to the load 200. As such, it should be noted that any converter circuit topology that implements this function may be used in a soft switching DC-to-DC converter in accordance with the present invention. Thus, the output side circuit 134 may be implemented as a full bridge rectifier circuit. However, for a low voltage output, the output side circuit 134 described herein is preferred.

To operate the DC-to-DC converter circuit 120, a controller 198 is used to provide switching signals to the switching devices Q1, Q4, Q6, and Q7 of the input side converter bridge circuits 122 and 124. The controller 198 alternately turns on the switches in each converter bridge 122 and 124. Thus, the DC input voltage sources 140 and 142 are alternately connected, in opposite polarity, to the primary windings 126 and 128 of the transformer 130. An AC voltage signal is thereby induced on the secondary winding 132 of the transformer 130. This AC signal is rectified by the output side circuit 134 to produce a DC output voltage signal on the output terminals 188 and 194 across the output side filter capacitor 196. The load 200, connected to the output terminals 188 and 194, is thereby provided with DC power. The magnitude of the DC voltage applied to the load 200 depends on the magnitude of the input voltage supplied to the input side converter bridges 122 and 124 by the DC voltage sources 140 and 142, the turns ratio $a = n_s/n_p$, where $n_s$ is the number of turns in the secondary winding 132 and $n_p$ is the number of turns in the primary windings 126 and 128 of the transformer 130, and the duty cycle of the converter bridges 122 and 124, as determined by the controller 198.

Besides setting the duty cycle of the converter 120, the controller 198 also controls the switching devices Q1, Q4, Q6, and Q7 to minimize switching losses by turning on the switching devices under zero voltage switching conditions. In the soft switching DC-to-DC converter circuit 120 of the present invention, zero voltage switching conditions are achieved using coupled inductors 202 and 204 that couple the first input side converter bridge circuit 122 and second input side converter bridge circuit 124 together. Each coupled inductor 202 and 204 includes windings, designated 202 and 204, in the first input side converter bridge circuit 122, coupled to corresponding windings, designated 202' and 204', in the second input side converter bridge circuit 124. The windings of each coupled inductor 202 and 204 are connected such that the pole of one input side converter bridge circuit is coupled to the complementary pole of the other input side converter bridge circuit. Thus, the coupled inductor winding 202 in the first input side converter bridge circuit 122 is connected to the first pole 160 of the first input side converter bridge circuit 122, with the correspondence coupled inductor winding 202' connected to the second pole 182 of the second input side converter bridge circuit 138. Similarly, the coupled inductor winding 204 is connected to the second pole 162 of the first input side converter bridge circuit 122, with the corresponding coupled winding 204' connected to the first pole 180 of the second input side converter bridge circuit 124. DC blocking capacitors 206 and 208 are preferably connected in series with each coupled inductor 202 and 204, respectively. The DC blocking capacitors 206 and 208 are mainly used to prevent any net DC current component from flowing in the loop formed by the coupled inductors 202 and 204 and the primary transformer windings 126 and 128.

The ends of the coupled inductors 202 and 204 that are not connected to the input side converter bridge poles 160, 162, 180, and 182, are connected to the center point nodes of a split capacitor arrangement. Thus, in the first input side converter bridge circuit 122, the inductor windings 202 and 204 are connected between the poles 160 and 162 and a center point node 210 where two capacitors 212 and 214, of equal capacitance, are connected together. The series connected capacitors 212 and 214 are connected in parallel with the DC input voltage source 140, across the DC bus lines 136. Similarly, in the second input side converter bridge circuit 124, the coupled inductor windings 202' and 204' are connected between the poles 180 and 182 and a center point node 216 where capacitors 218 and 220, also of equal capacitance, are connected together in series. The series connected capacitors 218 and 220 are connected in parallel with the input voltage source 142, across the DC bus lines 138 of the second input side converter bridge circuit 124.

It is desirable to maintain the voltages in each capacitor of a split capacitor pair at the same voltage level. Maintenance of equal voltage levels on each capacitor of the pair is particularly important where a peak current control scheme is used to control the DC-to-DC converter 120. With peak current control, small differences between the voltages across each capacitor of a capacitor pair will tend to get worse. Adding an auxiliary transformer winding and two auxiliary diodes to each input side converter bridge circuit 122 and 124 provides a simple and inexpensive approach to overcome this voltage equalization problem.

In the first input side converter bridge circuit 122, two diodes 222 and 224 are connected together in series at a node 226 across the DC bus lines 136. An auxiliary transformer winding 228 is connected between the node 226 and the center point node 210 between the split capacitors 212 and 214. Auxiliary winding 228 preferably has half the number of turns $n_p$ of the primary windings 126 and 128 of the transformer 130. Similarly, the second input side converter bridge circuit 124 includes two diodes 230 and 232 connected together in series at a node 234 across the DC bus lines 138. An auxiliary transformer winding 236, with half the number of turns $n_p$ of the primary windings 126 and 128 of the transformer 130, is connected between the node 234 and the center point node 216 between the split capacitors 218 and 220.

The auxiliary windings 228 and 236 act to equalize the voltage in each capacitor of a split capacitor pair. For example, if the capacitor voltage across capacitor 212 is higher than the voltage across capacitor 214, the diode 224 will be forced into conduction, when both switches Q1 and Q4 are conducting, causing energy to be transferred from capacitor 212 to capacitor 214. This charges up capacitor 214 and discharges capacitor 212, bringing both capacitors to the same voltage level. The auxiliary windings 228 and 236, along with the diodes 222, 224, 230, and 232 will equalize the capacitor voltages on a continuous basis. When switches Q1 and Q4 are conducting, the input voltage is applied across the primary winding 126. This voltage is then reflected across the auxiliary winding 228. Thus, if the voltage across capacitor 214 is less than the voltage across capacitor 212, the voltage at the node 226 will be brought below the ground voltage level on the DC bus line 136. This will cause the diode 224 to conduct current, charging capacitor 214 through the auxiliary winding 228, and discharging capacitor 212, until the two capacitors 212 and 214 reach the same voltage level. Similarly, if the voltage across capacitor 214 is higher than the voltage across capacitor 212, diode 222 will be forced into conduction when switches Q6 and Q7 in the second input side circuit 124 are conducting, to thereby equalize the voltages on the capacitors 212 and 214. The capacitors 218 and 220 in the second input side converter bridge circuit 124 are equalized by auxiliary winding 236 and diodes 230 and 232 in a similar manner.

Figure 1:
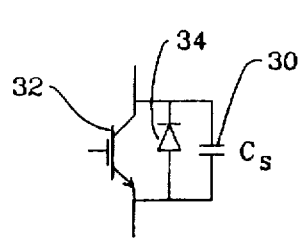
FIG. 1 is a schematic circuit diagram of a semiconductor switching device with a capacitive snubber element as used in prior art zero voltage switching converters.
Figure 2:
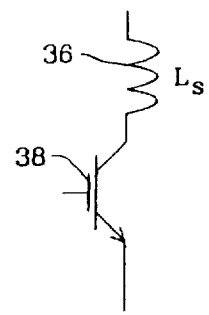
FIG. 2 is a schematic circuit diagram of a semiconductor switching device with an inductive snubber element as used in prior art zero current switching converters.
Figure 3:
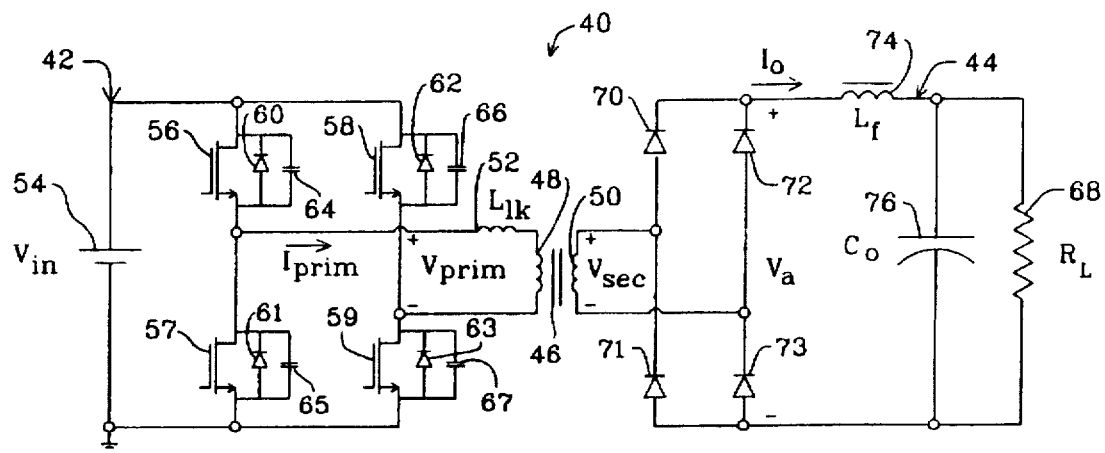
FIG. 3 is a schematic circuit diagram of a prior art full bridge PWM zero voltage switching converter topology.
Figure 4:
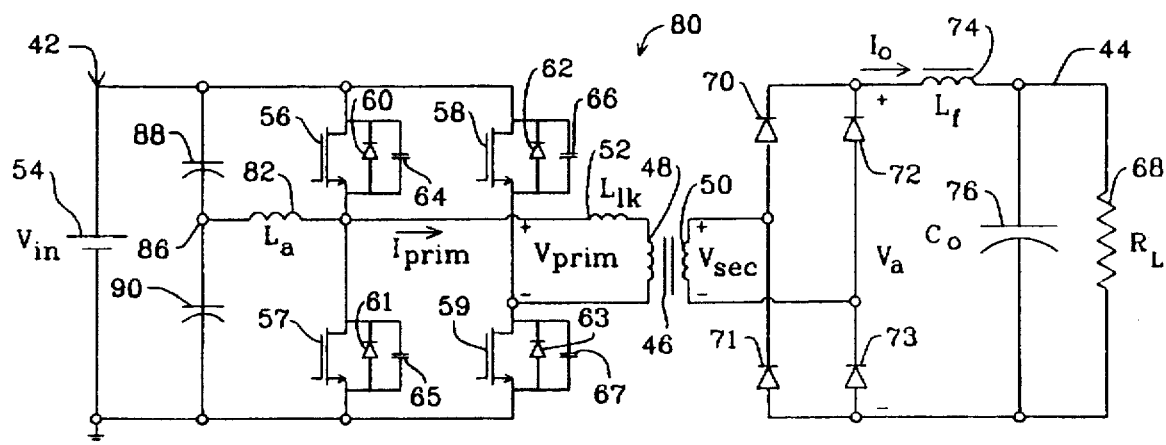
FIG. 4 is a schematic circuit diagram of a prior art pseudo-full bridge PWM zero voltage switching converter topology.
Figure 5:
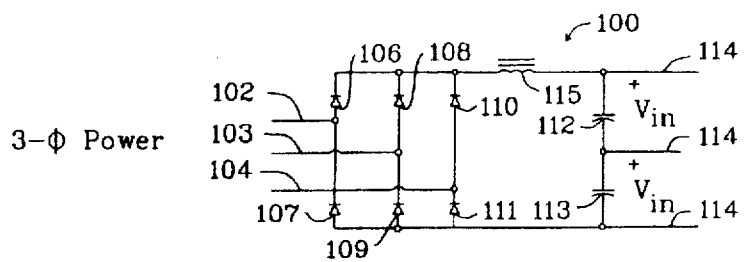
FIG. 5 is a schematic circuit diagram of a known simple three phase AC-to-DC rectifier bridge circuit.
Figure 7:
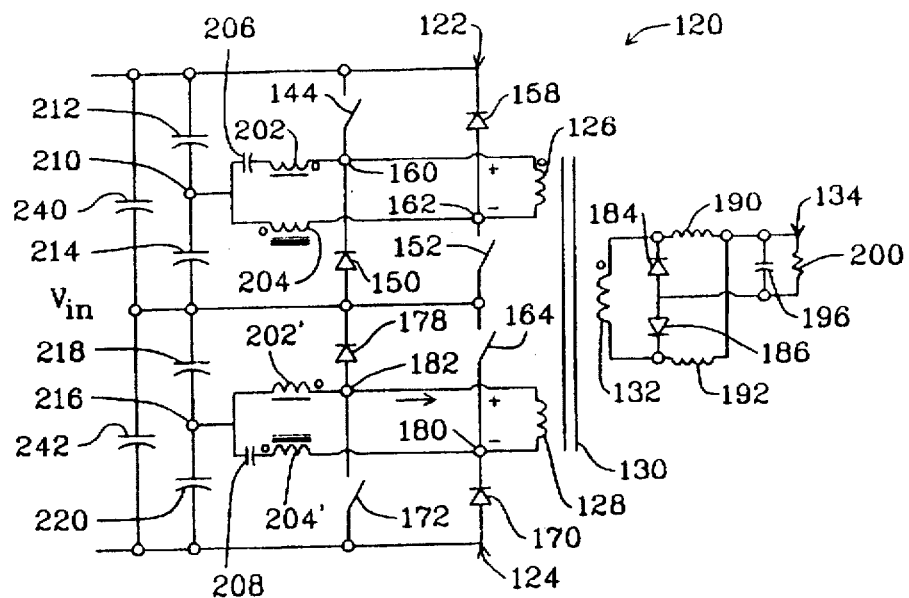
FIG. 7 is a schematic circuit diagram of a soft switching DC-to-DC converter in accordance with the present invention having two input side converter bridge circuits connected in series.
Figure 8:
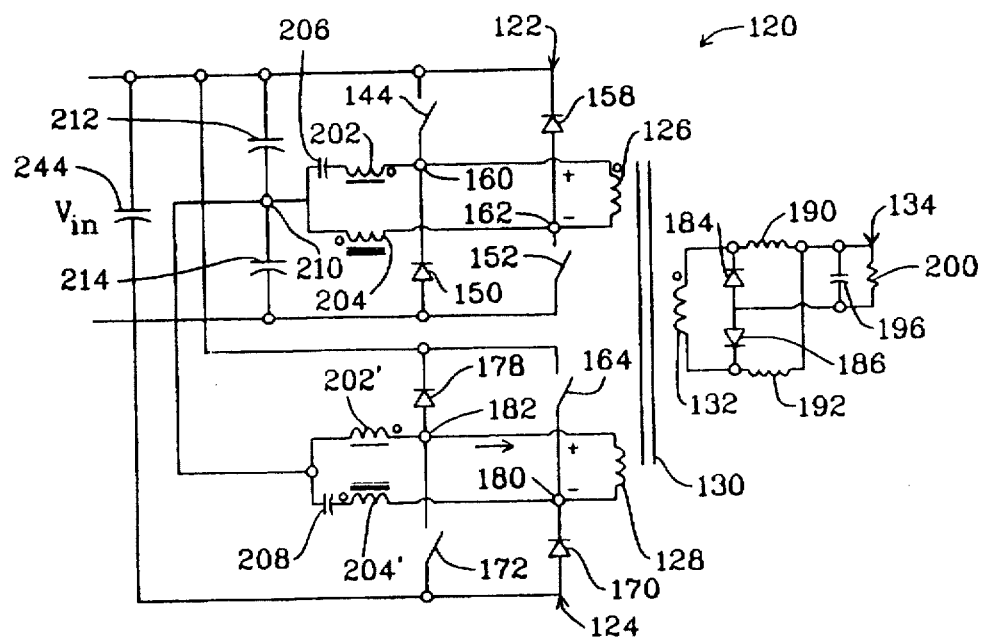
FIG. 8 is a schematic circuit diagram of a soft switching DC-to-DC converter in accordance with the present invention having two input side converter bridge circuits connected in parallel.
Figure 9:
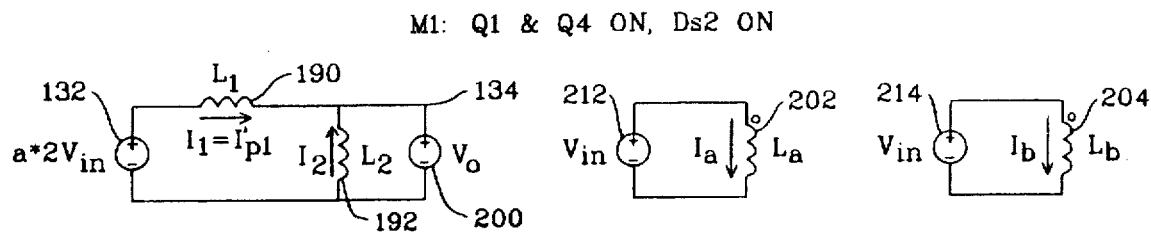
FIGS. 9–13 are schematic circuit diagrams of equivalent circuits for a soft switching DC-to-DC converter in accordance with the present invention for various operating modes.
Figure 10:
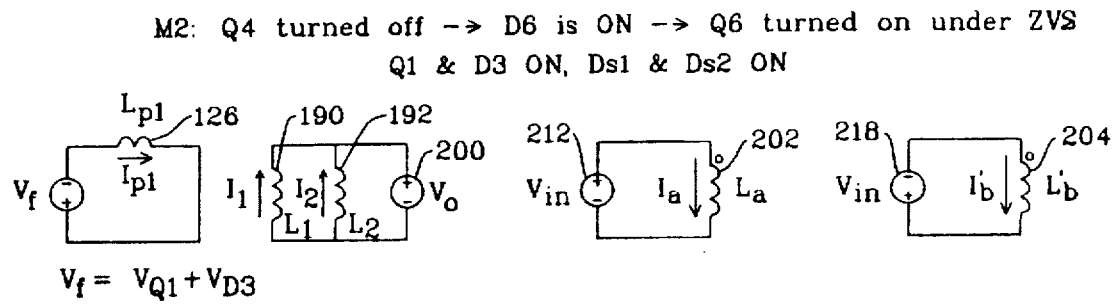

The DC-to-DC converter circuit 120 is shown having two separate input DC voltage sources 140 and 142 for supplying DC voltage to the bus lines 136 and 138 of each input side converter bridge 122 and 124, respectively. The DC voltage sources 140 and 142 may be implemented in a conventional manner, such as by use of a three phase AC-to-DC rectifier bridge circuit 100, as shown in FIG. 5. Each input voltage source 140 and 142 may be independently implemented, provided that each voltage source provides an identical voltage level. Alternatively, a single AC-to-DC converter may be used to implement both DC voltage sources 140 and 142. The two input side converter bridge circuits 122 and 124 may be connected either in parallel or in series with a simple DC voltage source. The series connection of two input side converter bridges 122 and 124 is illustrated, for example, in FIG. 7. The parallel connection of two input side converter bridges 122 and 124 is illustrated in FIG. 8. Note that the same circuit topology for the DC-to-DC converter 120 may be used for either the series or parallel connected input side converter bridges. Therefore, elements of the circuits illustrated in FIGS. 7 and 8 are labeled with the same reference numerals as are used for the elements of the circuit 120 illustrated in FIG. 6. Note also that, for simplicity, some elements of the circuit 120 of FIG. 6 are eliminated from the circuits illustrated in FIGS. 7 and 8. The ability to connect the two input side converter bridge circuits 122 and 124 either in series or parallel with a DC input voltage source allows the same DC-to-DC converter circuit 120 to be used with AC and DC power sources of different values. For low AC line voltages applied to an AC-to-DC converter voltage source, resulting in low DC input voltages to the DC-to-DC converter circuit 120, the parallel connection illustrated in FIG. 8 is used. For high line voltages, the series connection illustrated in FIG. 7 is used. For example, for a high AC line voltage of 460 V, the maximum DC bus voltage obtained using the AC-to-DC converter 100 of FIG. 5 is 650 V DC. If this voltage level is applied across the series connected input side converter bridge circuits of FIG. 7, the 650 V DC voltage will be divided across the capacitors 240 and 242. Thus, 325 V DC is applied across each input side converter bridge circuit 122 and 124. Using the same AC-to-DC converter to provide DC voltage to the DC-to-DC converter 120, but with an AC line voltage of 230 V AC, the maximum DC bus voltage obtained is 325 V DC. This voltage level may be applied to the parallel connected input side converter bridge circuits of FIG. 8. Thus, in this case, the voltage applied across the capacitor 244 and across each input side converter bridge circuit 122 and 124 is 325 V DC, the same as was applied across each input side converter bridge circuit 122 and 124 for the series connected converter bridges at a higher input line voltage. Thus, the device voltage stresses in each case are the same. Hence, the same circuit topology, with the same device ratings, can be used for high and low input line voltages. Note also that, for the parallel connected input side converter bridge circuits of FIG. 8, one of the split capacitor arrangements may be eliminated. Thus, the coupled windings of the inductors 202 and 204 in both input side converter bridge circuits 122 and 124 may be connected to the same split capacitor center point node 210. The use of an auxiliary transformer winding to maintain equal voltages on the split capacitor arrangements, as described above, may be applied to either the series or parallel connected circuit configuration.

As described previously, the input side converter bridge circuits 122 and 124 of the DC-to-DC converter 120 are coupled through the coupled inductors 202 and 204. Each coupled inductor 202 and 204 is connected such that it couples the pole of one input side converter bridge 122 to the complementary pole of the other input side converter bridge 124. This allows energy stored in the coupled inductors to commutate both poles of the converter bridges once a pole switching device is turned off. The coupled inductors provide for the charging of the output capacitance of a turned-off device in one converter bridge, and the discharge of the output capacitance of an incoming switching device in the other converter bridge, causing the anti-parallel connected diode of the incoming switching device to conduct. The incoming switching device may then be turned on under zero voltage switching conditions. This mechanism allows zero-voltage turn-on for all of the input side switching devices Q1, Q4, Q6, and Q7 of the DC-to-DC converter 120, allowing high frequency device switching with no turn-on losses. Turn-off losses can be minimized by using snubber capacitors across each switching device Q1, Q4, Q6, and Q7 to slow down the rate of voltage rise across the device once it is turned off. Note that the energy stored in the coupled inductors 202 and 204 must be sufficient to charge and discharge the device output capacitances 148, 156, 168, and 176, in addition to any added snubber capacitance.

Figure 14:
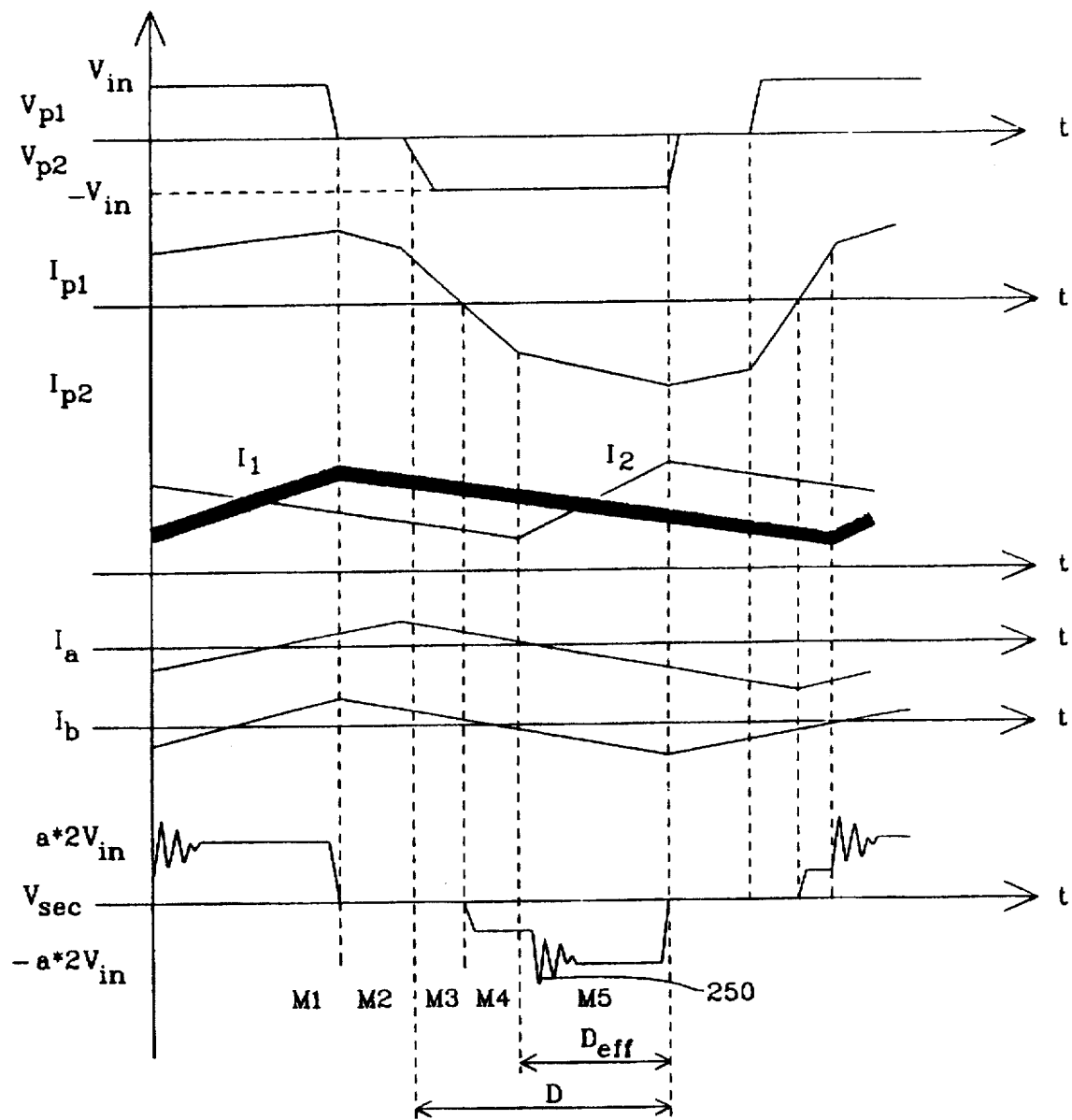
FIG. 14 is a graph of typical voltage and current waveforms for a soft switching DC-to-DC converter in accordance with the present invention for various operating modes.

The operation of the DC-to-DC converter circuit 120, to provide zero-voltage switching and no turn-on losses, is described with reference to the equivalent circuit diagrams of FIGS. 9–13, and the voltage and current waveforms illustrated in FIG. 14. Note that the connection of the two input side converter bridge circuits 122 and 124 in either series or parallel does not effect the operation of the converter circuit 120. The first mode of operation of the converter circuit 120, designated mode M1, is illustrated by the equivalent circuit diagrams of FIG. 9. With switching devices Q1 and Q4 of the first input side converter bridge circuit 122 on and conducting, the input voltage $V_{in}$ is connected across the primary winding 126 of the transformer 130. (Note that the input voltage is defined to be $2V_{in}$ for convenience of explanation.) Thus, a voltage level of $a*2V_{in}$, where a is the turns ratio of the transformer 130, appears on the secondary winding 132 of the transformer 130. Output side diode $D_{S2}$ will be on and conducting, with output side diode $D_{S1}$ reverse biased, and hence turned off. The current $I_{p1}$, through the primary winding 126 ramps up linearly and is reflected in the secondary winding 132 of the transformer 130. The output side current I1, through the first output side filter inductor 190, corresponds to the current through the secondary winding 132. Thus, during mode M1, the filter current $I_1$ will ramp up, while the output side current $I_2$, through the second output side filter inductor 192, will ramp down linearly as power is delivered to the load 200. With switching device Q1 conducting, the voltage $V_{in}$ across the capacitor 212 is applied across the coupled inductor 202. Thus, the current $I_a$ through the coupled inductor 202 ramps up linearly. In the same manner, with switching device Q4 on and conducting, the voltage $V_{in}$ across the capacitor 214 will be applied across the second coupled inductor 204, causing the current $I_b$ through the second coupled inductor 204 to ramp up linearly as well.

Operating mode M2 is initiated when switching device Q4 in the first input side converter bridge circuit 122 is turned off. Turning off switching device Q4 removes the input voltage from the primary winding 126 of the transformer 130, and thus the voltage on the secondary winding 132 of the transformer 130 drops to zero at this point. Thus, when switching device Q4 is turned off, the voltage across the transformer 130 essentially collapses to zero. Both output side diodes $D_{S1}$ and $D_{S2}$ turn on and begin conducting the output currents $I_1$ and $I_2$, since the current through the secondary winding 132 of the transformer 130 is no longer sufficient to support current $I_1$ through the output filter inductor 190. The output currents $I_i$ and $I_2$ continue to provide power to the load 200 from energy stored in the output filter inductors 190 and 192. However, both currents $I_1$ and $I_2$ decline linearly as this power is dissipated. Due to energy stored in the primary winding 126 and leakage inductance 133 of the transformer 130, the current through the primary winding 126 also does not stop instantly. The energy stored in the primary winding 126 charges the output capacitance 156 of switching device Q4, and discharges any output capacitance associated with diode D3, causing diode D3 to conduct. The current through the primary winding $I_{p1}$ is thus allowed to free wheel through switching device Q1 and diode D3 and begins to decrease linearly as the energy stored in the transformer 130 is dissipated. The voltage across the primary winding 126 of the transformer 130 is minimal during mode M2, being equal to the voltage drops across the switching device Q1 and the diode D3, i.e., $V_{Q1} + V_{D3}$. With switching device Q4 turned off, the conduction path from the capacitor 214 through the second coupled inductor 204 is cut off. Due to the coupling between the winding of the inductor 204 in the first input side converter bridge circuit 122 and the coupled inductor winding 204' in the second input side converter bridge circuit 124, the energy stored in the coupled inductor 204 will discharge through the winding 204' in the second input side converter bridge circuit 124. The energy stored in the coupled inductor winding 204' will discharge the output capacitance 168 of switching device Q6, causing its anti-parallel connected diode 166 to turn on and conduct. Switching device Q6 can then be turned on under zero voltage switching conditions. With switching device Q6 turned on, the voltage across the capacitor 218 will be connected across the coupled inductor winding 204'. This voltage $-V_{in}$ is in reverse polarity with respect to the voltage applied across the coupled inductor winding 204 when switching device Q4 was on and conducting. As a result, the current $i'_b$ through the coupled inductor winding 204' will start ramping down linearly and will eventually reverse directions. With switching device Q1 still on and conducting, the current $I_a$ in the first coupled inductor 202 continues to increase linearly. Since the turning off of switching device Q4 removes the input voltage from the transformer 130, the time at which switching device Q4 is turned off sets the duty cycle D of the converter 120, and hence determines the output voltage of the converter 120. This mode of control is referred to as phase shift control, since the output power is controlled by varying the phase shift of the two converter poles with respect to each other.

Figure 11:
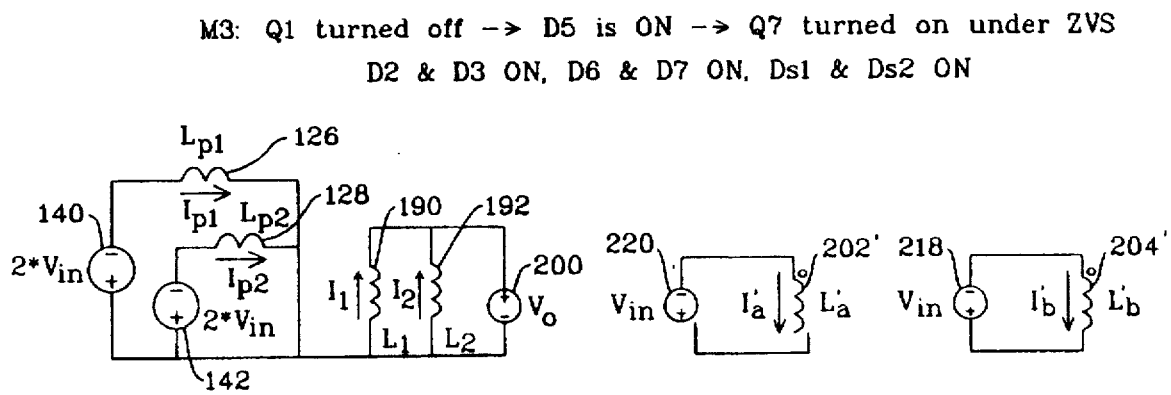
Figure 12:
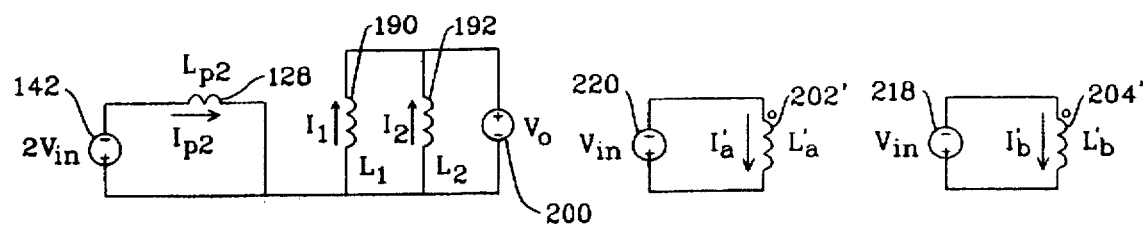
Figure 13:
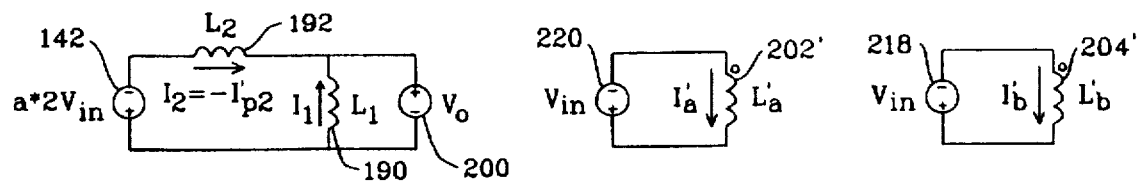
Figure 15:
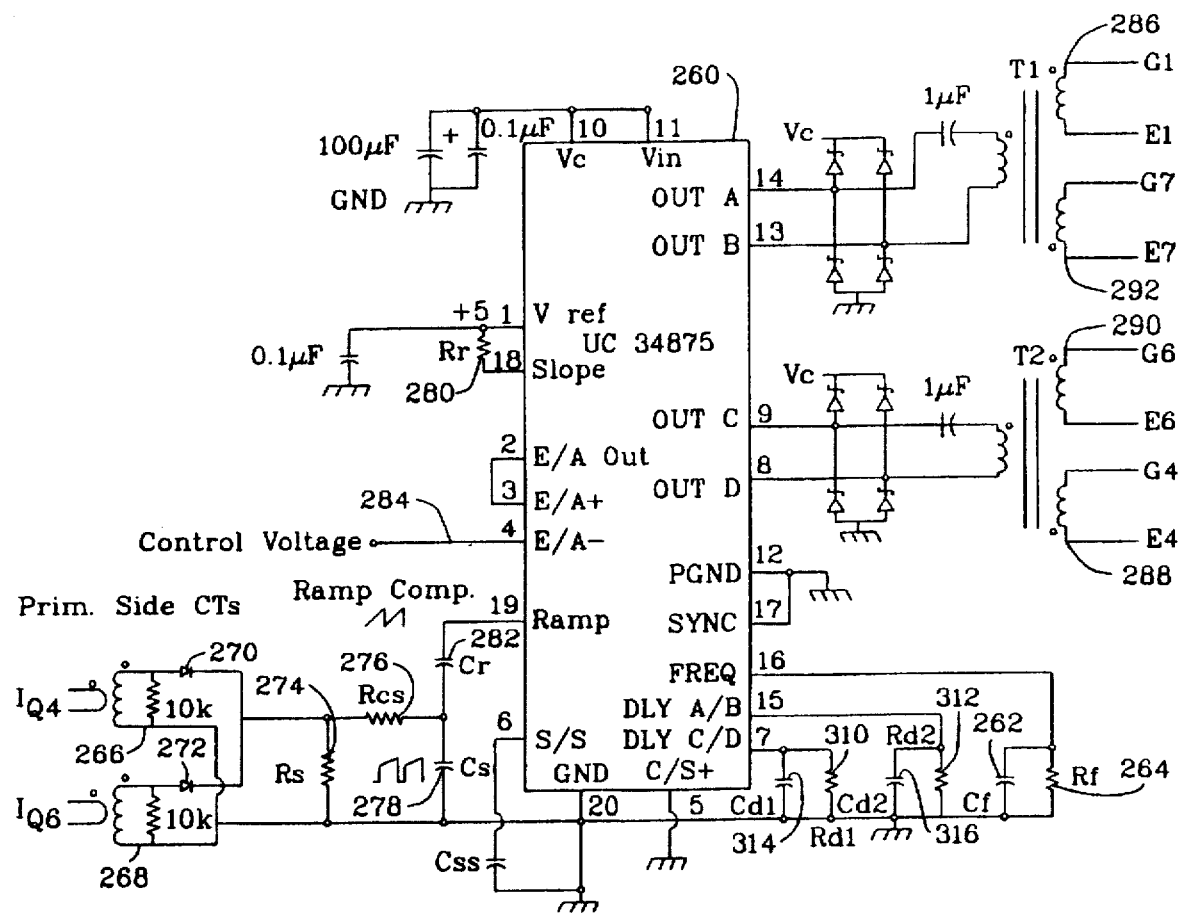
FIG. 15 is a schematic circuit diagram of a peak current control PWM controller for generating signals for switching the input side switching devices of a soft switching DC-to-DC converter in accordance with the present invention.

The initiation of operating mode M3, illustrated by the equivalent circuit of FIG. 11, begins by turning off switching device Q1 in the first input side converter bridge circuit 122. The free wheeling current path for the primary winding current $I_{p1}$ is thus cut off. The energy stored in the primary winding 126, along with some energy stored in the coupled inductor 202, will charge the output capacitance 148 of the switching device Q1, and discharge any output capacitance of diode D2, causing diode D2 to conduct. Remaining energy stored in the primary winding 126 of the transformer 130 will thus free wheel through diodes D2 and D3. With diodes D2 and D3 in the first input bridge converter circuit 122 conducting, source voltage $-2V_{in}$ is applied across the primary winding 126, causing the current $I_{p1}$ in the primary winding 126 to be rapidly driven to zero. Turning off switching device Q1 also disconnects the current path through the coupled inductor 202. Due to the coupling between the coupled inductor winding 202 in the first input side converter bridge circuit 122 and the coupled inductor winding 202' in the second input side converter bridge circuit 124, the energy stored in the coupled inductor 202 will discharge in the second input side converter bridge circuit 124 through coupled winding 202'. The energy stored in the coupled inductor winding 202' will discharge the output capacitance 176 of switching device Q7, causing its anti-parallel connected diode 174 to conduct. Switching device Q7 can now be turned on under zero voltage switching conditions. The voltage across capacitor 220 will thus be applied across the coupled inductor winding 202', applying a voltage $-V_{in}$ across the coupled conductor winding 202' in opposite polarity to the voltage $V_{in}$ connected across the coupled inductor winding 202 when switching device Q1 was on and conducting. As a result, the current $I_a'$ through the coupled inductor winding 202', will start ramping down linearly and will eventually reverse directions. With switching devices Q6 and Q7 in the second input side converter bridge circuit 124 on and conducting, the source voltage $-2V_{in}$ is applied across the primary winding 128 of the transformer 130, causing the current $I_{p2}$ through the primary winding 128 to rapidly increase, in the negative direction with respect to the current $I_{p1}$ in the first primary winding 126. In the output side circuit 134, the output currents $I_1$ and $I_2$ continue to flow through output side diodes $D_{S1}$ and $D_{S2}$ Operating mode M4, as illustrated by the equivalent circuit FIG. 12, is initiated when the current $I_{p1}$ through the primary winding 126 in the first input side converter bridge circuit 122 reaches zero and diodes D2 and D3 stop conducting. At this stage, the current $I_{p2}$ in primary winding 128 of the transformer 130 keeps ramping up linearly. The output side currents $I_1$ and $I_2$ keep flowing through both output side diodes $D_{S1}$ and $D_{S2}$ as the current induced in the secondary winding 132 of the transformer 130 is still insufficient to supply the output side current $I_2$. When the current $I_{p2}$ through the primary winding 128 reaches a level sufficient to equal the reflected secondary current $I_2$, operating mode M5, as illustrated by the equivalent circuit of FIG. 15, is initiated. At this point, the output current $I_2$ is taken up entirely by the current through the secondary winding 132 of the transformer 130 and begins to increase linearly. Thus, the output side diode $D_{S2}$ becomes reverse biased and ceases to conduct, and output side diode $D_{S1}$ takes over conduction of both output currents $I_1$ and $I_2$. The sudden turn-off of the output side diode $D_{S2}$ causes a voltage overshoot (250 in FIG. 14) due to the diode reverse recovery and the energy stored in the transformer leakage inductance 133. This same overshoot occurs in conventional full bridge DC-to-DC converters with inductive output filters. Hence, the output side diodes $D_{S1}$ and $D_{S2}$ must be derated, and/or snubber circuits used to limit the maximum voltage overshoot across them. During this mode, the voltage applied across the primary winding 128 of the transformer 130 is negative with respect to the voltage that was originally applied across the primary winding 126 of the transformer 130 through the first input side converter bridge circuit 122. Thus, the flux induced in the transformer during the positive half cycle is reset during the negative half cycle. Note that operating mode M5 is essentially equivalent to operating mode M1, with the DC voltage source 142 connected to the transformer 130 through the second input side converter bridge circuit 124 rather than DC voltage source 140 connected to the transformer 130 through the first input side converter bridge circuit 122.

Switching back from the negative half cycle to the positive half cycle, by turning off the switching devices Q6 and Q7 in the second input side converter bridge circuit 124 and turning on the switching devices Q1 and Q4 in the first input side converter bridge circuit 122, may be accomplished in a manner similar to that described above to achieve zero voltage switching of the switching devices Q1 and Q4 in the first input side converter bridge circuit 122. During the negative half cycle, the converter 120 goes through similar operating modes as have been described for the positive half cycle. Thus, to initiate the transition back to the positive half cycle, switching device Q6 in the second input side converter bridge circuit 124 is turned off. Energy stored in the second coupled inductor winding 204 causes the output capacitor 156 of switch Q4 in the first input side converter bridge circuit 122 to be discharged, turning on anti-parallel connected diode 154, and allowing switch Q4 to be turned on under zero voltage switching conditions. Switch Q7 in the second input side converter bridge circuit 124 is then turned off. The energy stored in coupled inductor winding 202 then discharges the output capacitance 148 of switch Q1 in the first input side converter bridge circuit 122, causing anti-parallel connected diode 146 to turn on, allowing switching device Q1 to be turned on under zero voltage switching conditions. Note that due to the arrangement of coupling inductors 202 and 204, turning off a switching device in one input side converter bridge causes part of the energy stored in the corresponding coupled inductor winding to discharge the output capacitance of an incoming switching device in the other input side converter bridge. This occurs in both halves of the switching cycle. Hence, zero voltage switching can be achieved over a wide load range by properly sizing the coupled inductors 202 and 204.

The controller 198 of the DC-to-DC converter circuit 120 of the present invention generates switching signals to be provided to control the converter switching devices to provide for both zero voltage switching and to maintain a duty cycle that provides a desired DC voltage, current, or power level at the output 200. Any controller or controller topology that implements such a switching scheme may be used. For example, a simple, modified conventional PWM controller may be used to control the converter. A preferred mode of control for the DC-to-DC converter topology 120 is peak current control. In peak current control, the output filter currents $I_1$ and $I_2$ are regulated to control the output power delivered to the load 200. Peak current control provides immunity against imbalances in switching between the two input side converter bridges 122 and 124, since no net DC flux can accumulate in the core of the main transformer 130. Peak current control can be achieved based on measured values of the currents $I_{Q4}$ and $I_{Q6}$ through the input side switching devices Q4 and Q6. As was discussed above, these currents reflect the secondary filter currents $I_1$ and $I_2$, respectively, when switching devices Q4 and Q6 are conducting. The peak current controller circuit will maintain the peaks of both of the currents $I_{Q4}$ and $I_{Q6}$ constant, and hence will nullify any flux imbalance in the main transformer 130. Another advantage of peak current control is the inherent feed forward of input DC bus voltage disturbances due to low frequency ripple (360 Hz). If the DC bus voltage increases, the current through the primary windings 126 and 128, and hence currents $I_{Q4}$ and $I_{Q6}$ through switching devices Q4 an Q6, will ramp up faster and will hit the preset peak earlier, reducing the duty cycle of the converter. The converse is also true, if the DC bus voltage decreases, currents $I_{Q4}$ and $I_{Q6}$ will hit the preset peak at a later point in time, increasing the duty cycle of the converter.

The main difficulty in implementing peak current control is the possibility of instability caused by second harmonic oscillations due to disturbances at duty cycles over 50 %. This subject has been discussed thoroughly in the literature, and solutions have been proposed. The most popular solution to prevent second harmonic instability is slope compensation. In slope compensation, a percentage of the down slope of the output currents $I_1$ and $I_2$ is added to the slope of the sensed currents $I_{Q4}$ and $I_{Q6}$. This will tend to reduce the errors accumulated due to disturbances, and hence eliminate the current loop instability.

Many industrial grade current control integrated circuits are available from different manufacturers and may be used as the basis of the controller 198 for the soft switching DC-to-DC converter of the present invention. An example of such an integrated circuit is the UC3846 integrated circuit made by Unitrode. However, since the output power of the converter 120 is controlled by phase shift control, a phase shift control type controller with peak current control capability is preferably used. The UC3875 PWM phase shift controller, also made by Unitrode, has the capability of providing both phase shift and peak current control functions.

An exemplary controller 198, using the UC 3875 integrated circuit controller 260, is described with reference to FIG. 15. The controller circuit 198 is capable of realizing both phase shift and peak current control functions. The switching frequency is set by selecting a capacitor 262 and resistor 264, of appropriate capacitance and resistance value, connected in parallel to the FREQ input of the integrated circuit 260. The currents $I_{Q4}$ and $I_{Q6}$ through the input side switching devices Q4 and Q6 are sensed using current transformers 266 and 268, respectively. The signals from the current transformers 266 and 268 are rectified by diodes 270 and 272, and a voltage signal corresponding to the currents $I_{Q4}$ and $I_{Q6}$, and hence to the corresponding output side currents $I_1$ and $I_2$, is obtained across the sense resistor 274. An RC filter formed by resistor 276 and capacitor 278 filters out the high frequency noise in the current feedback signal. Slope compensation is achieved by selecting resistor 280 and capacitor 282 to set a compensating ramp signal, which is added to the $I_{Q4}$ or $I_{Q6}$ current signal by the integrated circuit 260, to overcome any possible instability. Based on the input current signals $I_{Q4}$ and $I_{Q6}$, added to the compensating ramp signal for slope compensation, and a set control voltage level, resulting in an error amplifier output 284 from the integrated circuit controller 260, the controller 260 generates switching signals for the switching devices Q1, Q4, Q6, and Q7. Due to differences in the switching devices emitter potentials, gate transformers 286, 288, 290 and 292 are utilized to couple the gate switching signals from the integrated circuit controller 260 to the corresponding switching devices Q1, Q4, Q6, and Q7, respectively, while providing the required voltage isolation. Thus, for example, transformer winding 286 is connected between the gate and emitter of switching device Q1 in the first input side converter bridge circuit 122 to provide a switching signal from the integrated circuit controller 260 to turn on and turn off the switching device Q1. Similarly, transformer windings 288, 290, and 292 are connected between the gates and emitters of switching devices Q4, Q6, and Q7, respectively.

Figure 16:
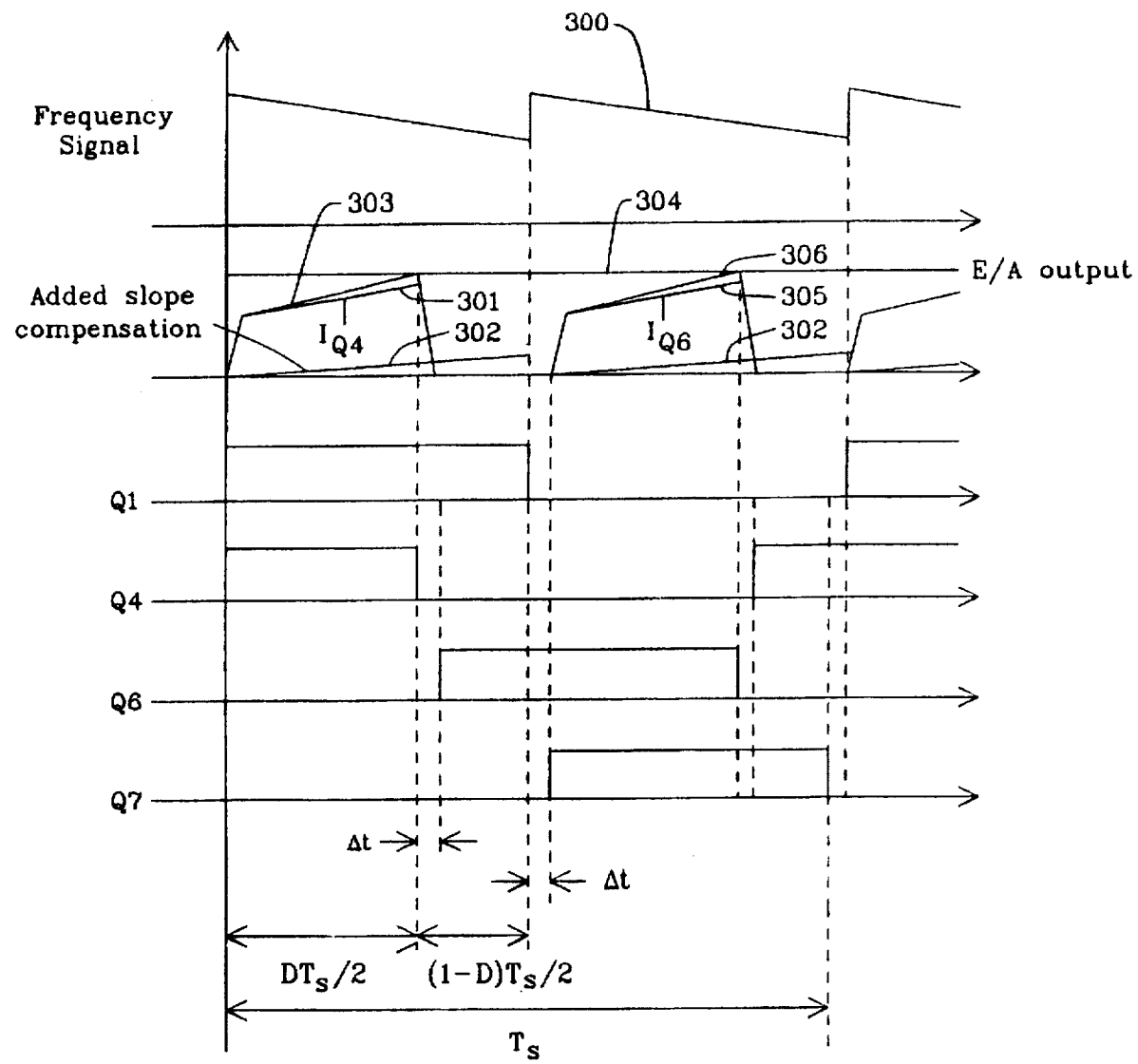
FIG. 16 is a timing diagram of switching signals for the input side switches of a soft switching DC-to-DC converter in accordance with the present invention for peak current control of the converter.

Exemplary switching signal waveforms provided by the controller 198 to the switching devices Q1, Q4, Q6, and Q7 are shown in FIG. 16. The frequency signal triangular waveform 300, set by resistor 264 and capacitor 262, sets the timing of the gating signals for switching devices Q1 and Q7. With, for example, switching devices Q1 and Q4 on and conducting, the current $I_{Q4}$, corresponding to output current $I_1$, ramps up linearly 301. The ramp signal for slope compensation 302 is added to the measured $I_{Q4}$ waveform 301. The intersection of the peak of this summed current feedback signal 303 and the error amplifier output level 304, which is set by the control voltage level, sets the duty cycle of the converter by providing a gating signal to turn off, in this case, switching device Q4. Similarly, with switching devices Q6 and Q7 conducting, current $I_{Q6}$, corresponding to output current $I_2$, increases linearly 305. The measured $I_{Q6}$ current 305 is added to the ramp signal for slope compensation 302, with the intersection of the peak of this summed current feedback signal 306 and the error amplifier output 304 setting the timing of the switching signal for turn-off of switching device Q6. The duty cycle, which is defined by the turn-off times of switching devices Q4 and Q6, is thus controlled based on the peak output currents $I_1$ and $I_2$, as reflected in currents $I_{Q4}$ and $I_{Q6}$ and as modified by the slope compensation value.

Note that when a switch is turned off in one of the input side converter bridge circuits 122 or 124, a corresponding switch in the other bridge circuit is turned on after a delay time, Δt, so as to allow enough time for the energy stored in the coupled inductors 202 and 204 to discharge the output capacitance of the incoming switching device, causing its anti-parallel connected diode to conduct first, before the device is gated on. This delay time Δt is thus necessary to achieve zero voltage switching turn-on of the incoming switching device. The minimum delay time Δt can be approximately calculated as follows:

$$I_{pk} * \Delta t = 8 * C_q * V_{in} \quad (1)$$

where:

$$I_{pk} = \frac{V_{in}}{4 * f_s * L_m} \quad (2)$$

$I_{pk}$ = the peak of the coupled inductor current at turnoff;
$C_Q$ = the switching device output capacitance;
$L_{in}$ = the coupled inductor magnetizing inductance; and
$f_S$ = the switching frequency.

The delay time for each coupled pair of switching devices can be programmed via resistors 310 and 312 and capacitors 314 and 316 connected in parallel RC arrangements to the integrated circuit controller 260, as illustrated in FIG. 15.

Operation of a soft switching DC-to-DC converter in accordance with the present invention has been verified via simulation and experimentation. A 1000 A, 12 V DC-to-DC converter, supplied with power from an AC-to-DC converter connected to a 230 V AC input line, was first simulated and then constructed. Due to the low line voltage, the two input side converter bridge circuits 122 and 124 were connected in parallel, as illustrated in FIG. 8. Readily available 600 V/75 A IGBT switching devices are used in the constructed AC-to-DC converter. The main transformer primary-to-secondary turns ratio was set to 10:1. Schottky diodes were used for the output side diodes $D_{S1}$ and $D_{S2}$, due to their low forward conduction voltage drop. The coupled inductors 202 and 204 were constructed using ferrite cores and litz wire. In order to guarantee zero voltage switching, even at light loads, 20 turns were used to wind the coupled inductors 202 and 204, which resulted in a magnetizing inductance of approximately 100 μH. As a result, the RMS current in the coupled inductors is nearly 4μ, which is only 5 % of the primary current. Two 30 μF DC blocking capacitors 206 and 208 were used to block any DC current component in the coupled inductors 202 and 204. Note that for the simulation and experimental results, the delay time Δt was set to be 1 microsecond, to guarantee zero voltage switching, and the switching frequency was set to 20 Khz.

Figure 17:
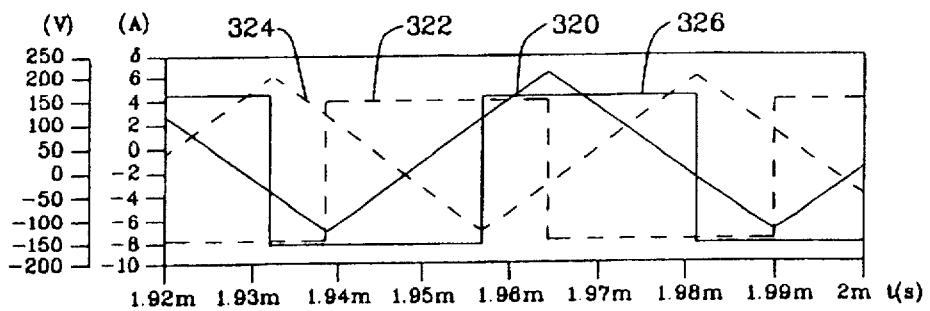
FIGS. 17–20 are graphs of voltage and current waveforms from the simulation of a soft switching DC-to-DC converter in accordance with the present invention.
Figure 18:
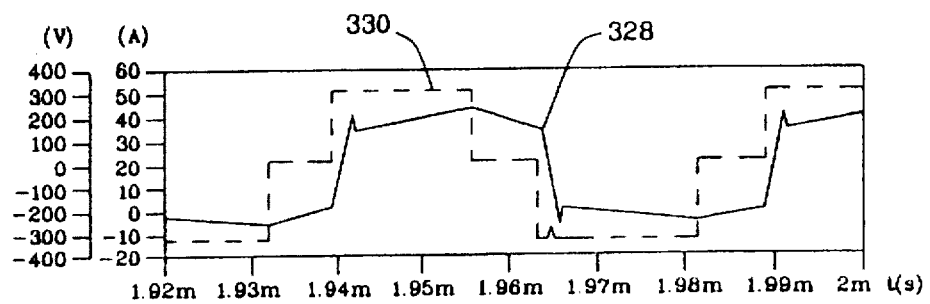
Figure 19:
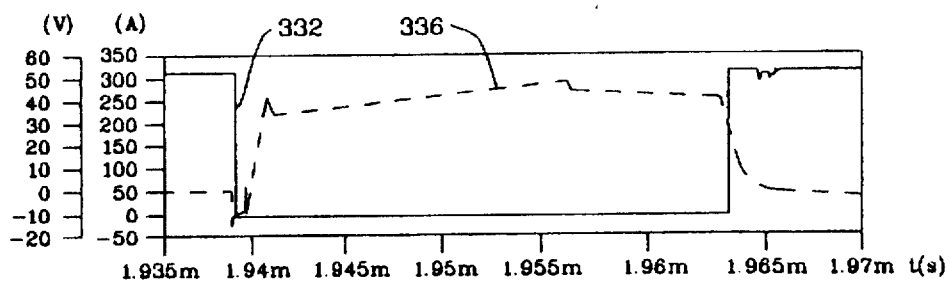
Figure 20:
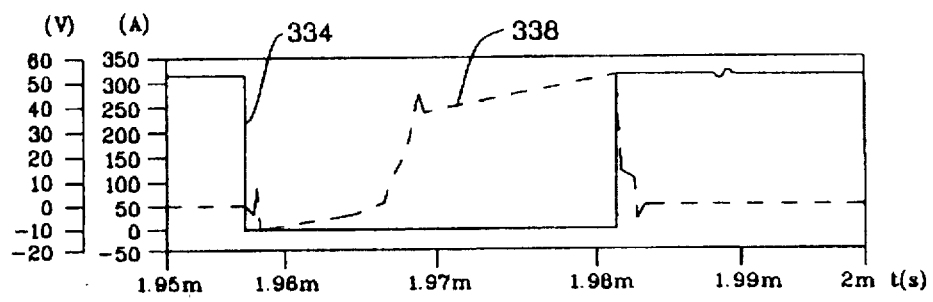

FIGS. 17–20 show the simulation results. FIG. 17 illustrates the relationship between the output current $I_1$, waveform 320, the output current $I_2$, waveform 324, and the voltages applied across the primary winding 126, waveform 322, and across the primary winding 128, waveform 326. As can be seen, the output current $I_1$ ramps up when the input voltage is applied across the primary winding 126, and the output current $I_2$ ramps up when the DC input voltage is applied across the primary winding 128. Both output currents $I_1$ and $I_2$ otherwise ramp down. FIG. 18 illustrates the current through the primary windings, waveform 328, and the voltage 330 on the primary windings of the transformer 130. The simulated voltages and currents match the expected waveforms shown in FIG. 14. FIGS. 19 and 20 show voltage waveforms 332 and 334 and current waveforms 336 and 338 across and through two of the converter switching devices. From these waveforms, it is clear that the voltages 332 and 334 across the switching devices are reset to zero first, before the device is turned on. This is confirmed by the negative current flowing through the anti-parallel connected diodes of the switching devices prior to turn-on of the device, after which the current 336 and 338 through the devices increases rapidly.

Figure 21:
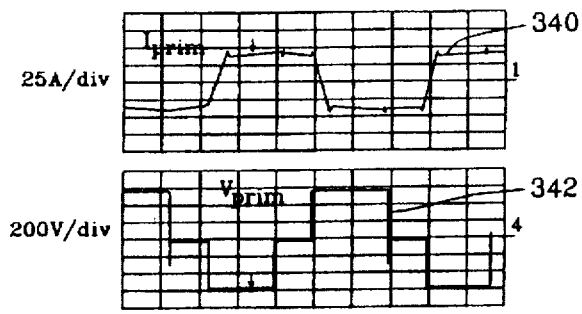
FIGS. 21–25 are graphs of voltage and current waveforms from the experimental testing of a soft switching DC-to-DC converter made in accordance with the present invention.
Figure 22:
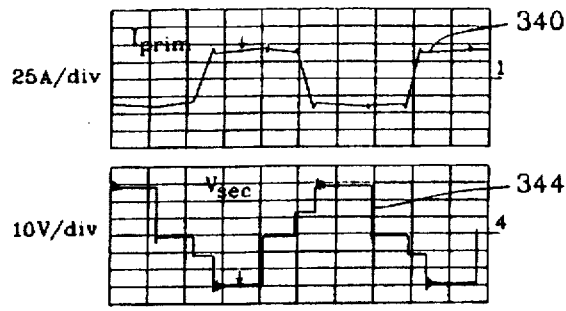
Figure 23:
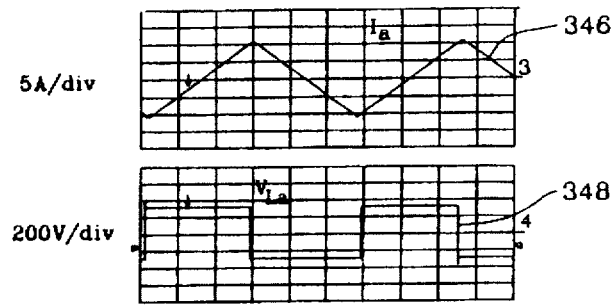
Figures 24, 25:
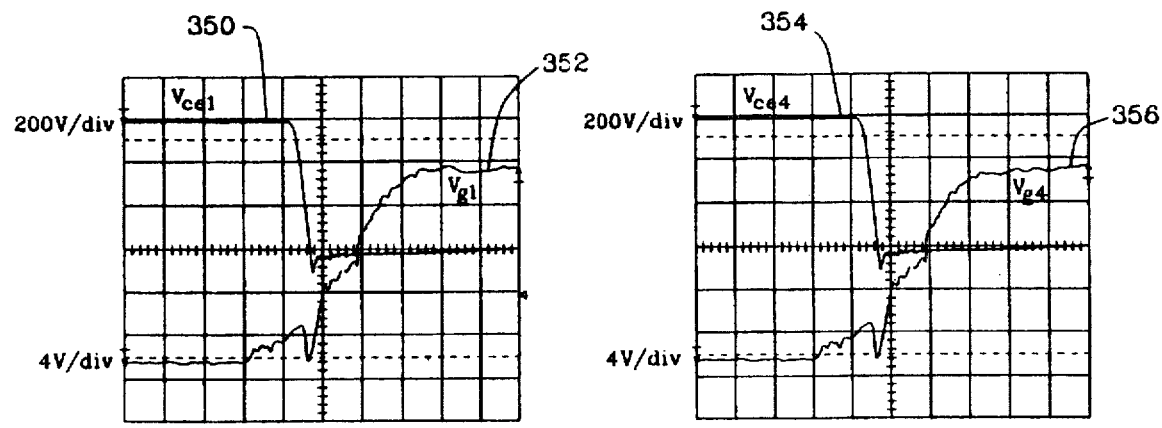

The experimental results for the constructed DC-to-DC converter are shown in FIGS. 21–25. FIG. 21 illustrates the current through the primary winding 126, waveform 340, and the voltage across the primary winding 126, waveform 342. FIG. 22 illustrates the current through the primary winding 126, waveform 340, and the voltage across the secondary winding 132 of the transformer 130, waveform 344. FIG. 23 illustrates current $I_a$ though the first coupled inductor 202, waveform 346, and the corresponding voltage across the inductor 202, waveform 348. The experimental waveforms match both the simulation results and the expected waveforms illustrated in FIG. 14. FIG. 24 illustrates the collector-emitter voltage of switching device Q1, waveform 350, and the corresponding gate voltage for switching device Q1, waveform 352. Similarly, FIG. 25 illustrates the collector-emitter voltage of switching device Q4, waveform 354, and the gate voltage of switching device Q4, waveform 356. Zero voltage switching of the switching devices Q1 and Q4 are confirmed by examining the voltage waveforms 350, 352, 354, and 356. As can be seen, collector-to-emitter voltages 350 and 354 are brought down to zero first, before the gate switching signals of waveforms 352 and 356, are applied. Thus, zero voltage switching of the switching devices is achieved.

The present invention is not limited to the particular embodiments disclosed herein, but embraces such modified forms thereof as come within the scope of the following claims.

What is claimed is:

1. A DC-to-DC converter, comprising:
   (a) a first input side converter bridge circuit including first DC bus lines adapted to be connected to a DC voltage source, a first switching device and a first diode connected together in series at a first pole of the first input side circuit and between the first DC bus lines, and a second switching device and second diode connected together in series at a second pole of the first input side circuit and between the first DC bus lines such that when the first and second switching devices are turned on a DC voltage applied on the first DC bus lines is applied between the first and second poles of the first input side circuit;
   (b) a second input side converter bridge circuit including second DC bus lines adapted to be connected to a DC voltage source, a third switching device and a third diode connected together in series at a first pole of the second input side circuit and between the second DC bus lines, and a fourth switching device and fourth diode connected together in series at a second pole of the second input side circuit and between the second DC bus lines such that when the third and fourth switching devices are turned on a DC voltage applied on the second DC bus lines is applied between the first and second poles of the second input side circuit;

(c) a first coupled inductor coupling the first pole of the first input side circuit to the second pole of the second input side circuit;

(d) a second coupled inductor coupling the second pole of the first input side circuit to the first pole of the second input side circuit;

(e) a transformer having a secondary winding and a first primary winding connected between the first and second poles of the first input side circuit and a second primary winding connected in opposite polarity to the first primary winding between the first and second poles of the second input side circuit;

(f) an output side converter circuit having output terminals and connected to the secondary of the transformer and including means for converting an AC signal on the secondary of the transformer to a DC output signal on the output terminals; and (g) a converter controller including switching device control means for turning on and off the first, second, third, and fourth switching devices in a sequence to alternately connect the first DC bus lines to the first primary winding of the transformer and the second DC bus lines to the second primary winding of the transformer to generate an AC signal on the secondary winding of the transformer, the switching device control means including means for delaying the turn on of a switching device in a one of the input side circuits following the turn off of a switching device in the other of the input side circuits until a voltage across the switching device being turned on is reduced to zero by energy stored in a one of the coupled inductors such that the switching device is turned on under zero voltage switching conditions.

2. The DC-to-DC converter of claim 1 further comprising an AC-to-DC converter connected to the first and second DC bus lines to provide a DC voltage signal to the first and second input side circuits from an AC power source.

3. The DC-to-DC converter of claim 2 wherein the AC-to-DC converter is a three phase rectifier bridge circuit for converting three phase AC power from a three phase AC power source to the DC voltage signal.

4. The DC-to-DC converter of claim 1 further comprising:

(a) two capacitors of equal capacitance connected together in series at a first center point node and across the first DC bus lines, (b) two capacitors of equal capacitance connected together in series at a second center point node and across the second DC bus lines, and wherein (c) the first coupled inductor has a first inductor winding connected between the first center point node and the first pole of the first input side circuit and a second inductor winding connected between the second center point node and the second pole of the second input side circuit and wherein the first and second inductor windings of the first coupled inductor are coupled together, and wherein (d) the second coupled inductor has a first inductor winding connected between the first center point node and the second pole of the first input side circuit and a second inductor winding connected between the second center point node and the first pole of the second input side circuit and wherein the first and second inductor windings of the second coupled inductor are coupled together.

5. The DC-to-DC converter of claim 4 further comprising a means for maintaining a same voltage level across the two capacitors connected across each of the first and second DC bus lines.

6. The DC-to-DC converter of claim 5 wherein the means for maintaining the same voltage level across the capacitors includes two diodes connected together in series at a first node between the first DC bus lines and a first auxiliary winding of the transformer connected between the first node and the first center point node, and two diodes connected together in series at a second node between the second DC bus lines and a second auxiliary winding of the transformer connected between the second node and the second center point node.

7. The DC-to-DC converter of claim 1 wherein the switching devices are transistors.

8. The DC-to-DC converter of claim 7 wherein the switching devices are IGBTs.

9. The DC-to-DC converter of claim 1 wherein the output side converter circuit includes two output side diodes connected together in series to a first output terminal and across the secondary winding of the transformer and oriented such that the diodes conduct primarily in opposite directions from each other, a first output side filter inductor connected between a first terminal of the secondary winding and a second output terminal, and a second output side filter inductor connected between a second terminal of the secondary winding and the second output terminal.

10. The DC-to-DC converter of claim 9 wherein the converter controller includes means for regulating peak currents through the first and second output side filter inductors to control output power of the converter.

11. The DC-to-DC converter of claim 1 wherein the converter controller includes an integrated circuit controller.

12. A DC-to-DC converter, comprising:

(a) a first input side converter bridge circuit including first DC bus lines adapted to be connected to a DC voltage source and two capacitors of equal capacitance connected together in series at a first center point node and between the first DC bus lines, a first switching device and a first diode connected together in series at a first pole of the first input side circuit and between the first DC bus lines, and a second switching device and second diode connected together in series at a second pole of the first input side circuit and between the first DC bus lines such that when the first and second switching devices are turned on a DC voltage applied on the first DC bus lines is applied between the first and second poles of the first input side circuit;

(b) a second input side converter bridge circuit including second DC bus lines adapted to be connected to a DC voltage source and two capacitors of equal capacitance connected together in series at a second center point node and between the second DC bus lines, a third switching device and a third diode connected together in series at a first pole of the second input side circuit and between the second DC bus lines, and a fourth switching device and fourth diode connected together in series at a second pole of the second input side circuit and between the second DC bus lines such that when the third and fourth switching devices are turned on a DC voltage applied on the second DC bus lines is applied between the first and second poles of the second input side circuit;

(c) a first coupled inductor having a first inductor winding connected between the first center point node and the first pole of the first input side circuit and a second inductor winding connected between the second center point node and the second pole of the second input side circuit and wherein the first and second inductor windings of the first coupled inductor are coupled together;

(d) a second coupled inductor having a first inductor winding connected between the first center point node and the second pole of the first input side circuit and a second inductor winding connected between the second center point node and the first pole of the second input side circuit and wherein the first and second inductor windings of the second coupled inductor are coupled together;

(e) a transformer having a secondary winding, two auxiliary windings, and a first primary winding connected between the first and second poles of the first input side circuit and a second primary winding connected in opposite polarity to the first primary winding between the first and second poles of the second input side circuit;

(f) means for maintaining a same voltage level across the two capacitors in each of the first and second input side circuits including two diodes connected together in series at a first node between the first DC bus lines and a first auxiliary winding of the transformer connected between the first node and the first center point node, and two diodes connected together in series at a second node between the second DC bus lines and a second auxiliary winding of the transformer connected between the second node and the second center point node;

(g) an output side converter circuit having output terminals and connected to the secondary of the transformer and including means for converting an AC signal on the secondary of the transformer to a DC output signal on the output terminals; and (h) a converter controller including switching device control means for turning on and off the first, second, third, and fourth switching devices in a sequence to alternately connect the first DC bus lines to the first primary winding of the transformer and the second DC bus lines to the second primary winding of the transformer to generate an AC signal on the secondary winding of the transformer, the switching device control means including means for delaying the turn on of a switching device in a one of the input side circuits following the turn off of a switching device in the other of the input side circuits until a voltage across the switching device being turned on is reduced to zero by energy stored in a one of the coupled inductors such that the switching device is turned on under zero voltage switching conditions.

13. The DC-to-DC converter of claim 12 further comprising an AC-to-DC converter connected to the first and second DC bus lines to provide a DC voltage signal to the first and second input side circuits from an AC power source.

14. The DC-to-DC converter of claim 13 wherein the AC-to-DC converter is a three phase rectifier bridge circuit for converting three phase AC power from a three phase AC power source to the DC voltage signal.

15. The DC-to-DC converter of claim 12 wherein the switching devices are transistors.

16. The DC-to-DC converter of claim 15 wherein the switching devices are IGBTs.

17. The DC-to-DC converter of claim 12 wherein the output side converter circuit includes two output side diodes connected together in series to a first output terminal and across the secondary winding of the transformer and oriented such that the diodes conduct primarily in opposite directions from each other, a first output side filter inductor connected between a first terminal of the secondary winding and a second output terminal, and a second output side filter inductor connected between a second terminal of the secondary winding and the second output terminal.

18. The DC-to-DC converter of claim 17 wherein the converter controller includes means for regulating peak currents through the first and second output side filter inductors to control output power of the converter.

19. The DC-to-DC converter of claim 12 wherein the converter controller includes an integrated circuit controller.

20. A DC-to-DC converter, comprising:

(a) a first input side converter bridge circuit including first DC bus lines adapted to be connected to a DC voltage source and two capacitors of equal capacitance connected together in series at a center point node between the first DC bus lines, a first switching device and a first diode connected together in series at a first pole of the first input side circuit and between the first DC bus lines, and a second switching device and second diode connected together in series at a second pole of the first input side circuit between the first DC bus lines such that when the first and second switching devices are turned on a DC voltage applied on the first DC bus lines is applied between the first and second poles of the first input side circuit;

(b) a second input side converter bridge circuit including second DC bus lines connected in parallel to the first DC bus lines, a third switching device and a third diode connected together in series at a first pole of the second input side circuit and between the second DC bus lines, and a fourth switching device and fourth diode connected together in series at a second pole of the second input side circuit and between the second DC bus lines such that when the third and fourth switching devices are turned on a DC voltage applied on the second DC bus lines is applied between the first and second poles of the second input side circuit;

(c) a first coupled inductor having a first inductor winding connected between the center point node and the first pole of the first input side circuit and a second inductor winding connected between the center point node and the second pole of the second input side circuit and wherein the first and second inductor windings of the first coupled inductor are coupled together;

(d) a second coupled inductor having a first inductor winding connected between the center point node and the second pole of the first input side circuit and a second inductor winding connected between the center point node and the first pole of the second input side circuit and wherein the first and second inductor windings of the second coupled inductor are coupled together;

(e) a transformer having a secondary winding and a first primary winding connected between the first and second poles of the first input side circuit and a second primary winding connected in opposite polarity to the first primary winding between the first and second poles of the second input side circuit;

(f) an output side converter circuit having output terminals and connected to the secondary of the transformer and including means for converting an AC signal on the secondary of the transformer to a DC output signal on the output terminals; and (g) a converter controller including switching device control means for turning on and off the first, second, third, and fourth switching devices in a sequence to alternately connect the first DC bus lines to the first primary winding of the transformer and the second DC bus lines to the second primary winding of the transformer to generate an AC signal on the secondary winding of the transformer, the switching device control means including means for delaying the turn on of a switching device in a one of the input side circuits following the turn off of a switching device in the other of the input side circuits until a voltage across the switching device being turned on is reduced to zero by energy stored in a one of the coupled inductors such that the switching device is turned on under zero voltage switching conditions.

21. The DC-to-DC converter of claim 20 further comprising an AC-to-DC converter connected to the first DC bus lines to provide a DC voltage signal to the first and second input side circuits from an AC power source.

22. The DC-to-DC converter of claim 21 wherein the AC-to-DC converter is a three phase rectifier bridge circuit for converting three phase AC power from a three phase AC power source to the DC voltage signal.

23. The DC-to-DC converter of claim 20 wherein the switching devices are transistors.

24. The DC-to-DC converter of claim 23 wherein the switching devices are IGBTs.

25. The DC-to-DC converter of claim 20 wherein the output side converter circuit includes two output side diodes connected together in series to a first output terminal and across the secondary winding of the transformer and oriented such that the diodes conduct primarily in opposite directions from each other, a first output side filter inductor connected between a first terminal of the secondary winding and a second output terminal, and a second output side filter inductor connected between a second terminal of the secondary winding and the second output terminal.

26. The DC-to-DC converter of claim 25 wherein the converter controller includes means for regulating peak currents through the first and second output side filter inductors to control output power of the converter.

27. The DC-to-DC converter of claim 20 wherein the converter controller includes an integrated circuit controller.

* * * * *

UNITED STATES PATENT AND TRADEMARK OFFICE
CERTIFICATE OF CORRECTION

PATENT NO. : 5,781,419
DATED : July 14, 1998
INVENTOR(S) : Nassar H. Kutkut, et al.

It is certified that error appears in the above-identified patent and that said Letters Patent is hereby corrected as shown below:

In column 2, line 18 of the patent, "semi-conductor" should be --semiconductor--.

In column 9, line 19 of the patent, "$n_s$," should be --$n_s$--.

In column 12, line 37 of the patent, "$I_{p1}$," should be --$I_{p1}$--.

In column 12, line 39 of the patent, "I1," should be --$I_1$,--.

In column 12, line 45 of the patent, "Q1conducting" should be --Q1 conducting--.

In column 14, lines 21-22 of the patent, "$D_{s2}$." should be --$D_{S2}$.--.

In column 14, line 56 of the patent, "MS" should be --M5--.

In column 17, line 23 of the patent, "At" should be --$\Delta t$--

In column 17, line 25 of the patent, "$C_q$" should be --$C_Q$--.

UNITED STATES PATENT AND TRADEMARK OFFICE
CERTIFICATE OF CORRECTION

PATENT NO. : 5,781,419
DATED : July 14, 1998
INVENTOR(S) : Nassar H. Kutkut, et. al.

It is certified that error appears in the above-identified patent and that said Letters Patent is hereby corrected as shown below:

In column 17, line 34 of the patent, "$L_{in}$" should be --$L_m$--.

In column 17, line 58 of the patent, "4µ" should be --4A--; "5 %" should be --5%--.

Signed and Sealed this

Twenty-seventh Day of June, 2000

*Attest:*

Q. TODD DICKINSON

*Attesting Officer*   *Director of Patents and Trademarks*